(12) United States Patent
Tanaka et al.

(10) Patent No.: US 9,865,397 B2
(45) Date of Patent: Jan. 9, 2018

(54) MULTILAYER ELECTRONIC COMPONENT

(71) Applicant: TDK CORPORATION, Tokyo (JP)

(72) Inventors: Hirobumi Tanaka, Tokyo (JP); Yohei Noda, Tokyo (JP); Keisuke Okai, Tokyo (JP); Makoto Endo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/264,939

(22) Filed: Sep. 14, 2016

(65) Prior Publication Data

US 2017/0076865 A1 Mar. 16, 2017

(30) Foreign Application Priority Data

Sep. 15, 2015 (JP) .................................. 2015-182082

(51) Int. Cl.
*H01G 4/30* (2006.01)
*H01G 4/232* (2006.01)
*H01G 4/224* (2006.01)
*H01G 4/12* (2006.01)

(52) U.S. Cl.
CPC ............... *H01G 4/30* (2013.01); *H01G 4/224* (2013.01); *H01G 4/232* (2013.01); *H01G 4/12* (2013.01); *H01G 4/2325* (2013.01)

(58) Field of Classification Search
CPC .......... H01G 4/30; H01G 4/224; H01G 4/232; H01G 4/12; H01G 4/35
See application file for complete search history.

(56) References Cited

U.S. PATENT DOCUMENTS

| | | | | |
|---|---|---|---|---|
| 4,658,328 A | * | 4/1987 | Sakabe | H01G 4/232 361/309 |
| 6,232,867 B1 | * | 5/2001 | Yoshida | H01C 7/102 29/610.1 |
| 6,965,167 B2 | * | 11/2005 | Liu | H01G 4/224 257/528 |
| 2002/0027764 A1 | * | 3/2002 | Kishimoto | H01G 2/12 361/321.2 |
| 2006/0293168 A1 | * | 12/2006 | Mori | C03C 3/066 501/136 |
| 2012/0313489 A1 | * | 12/2012 | Shirakawa | H01G 4/30 310/365 |

FOREIGN PATENT DOCUMENTS

JP S59-222917 A 12/1984

* cited by examiner

*Primary Examiner* — Dion R Ferguson
(74) *Attorney, Agent, or Firm* — Oliff PLC

(57) ABSTRACT

A multilayer electronic component includes an element body having an internal electrode layer and a dielectric layer. These are substantially parallel to a plane including a first axis and a second axis and are alternately laminated along a third axis direction. Side surfaces facing each other in the first axis direction are respectively equipped with an insulating layer. End surfaces facing each other in the second axis direction are respectively equipped with an external electrode. A main component of the insulating layer is constituted by glass containing Si at 25 wt % or more. The external electrode includes glass containing at least Si. The external electrode covers an end portion in the second axial direction of the insulating layer. A diffusing layer is partially present at least at a bonding portion of the insulating layer with the external electrode in the side surface.

16 Claims, 15 Drawing Sheets

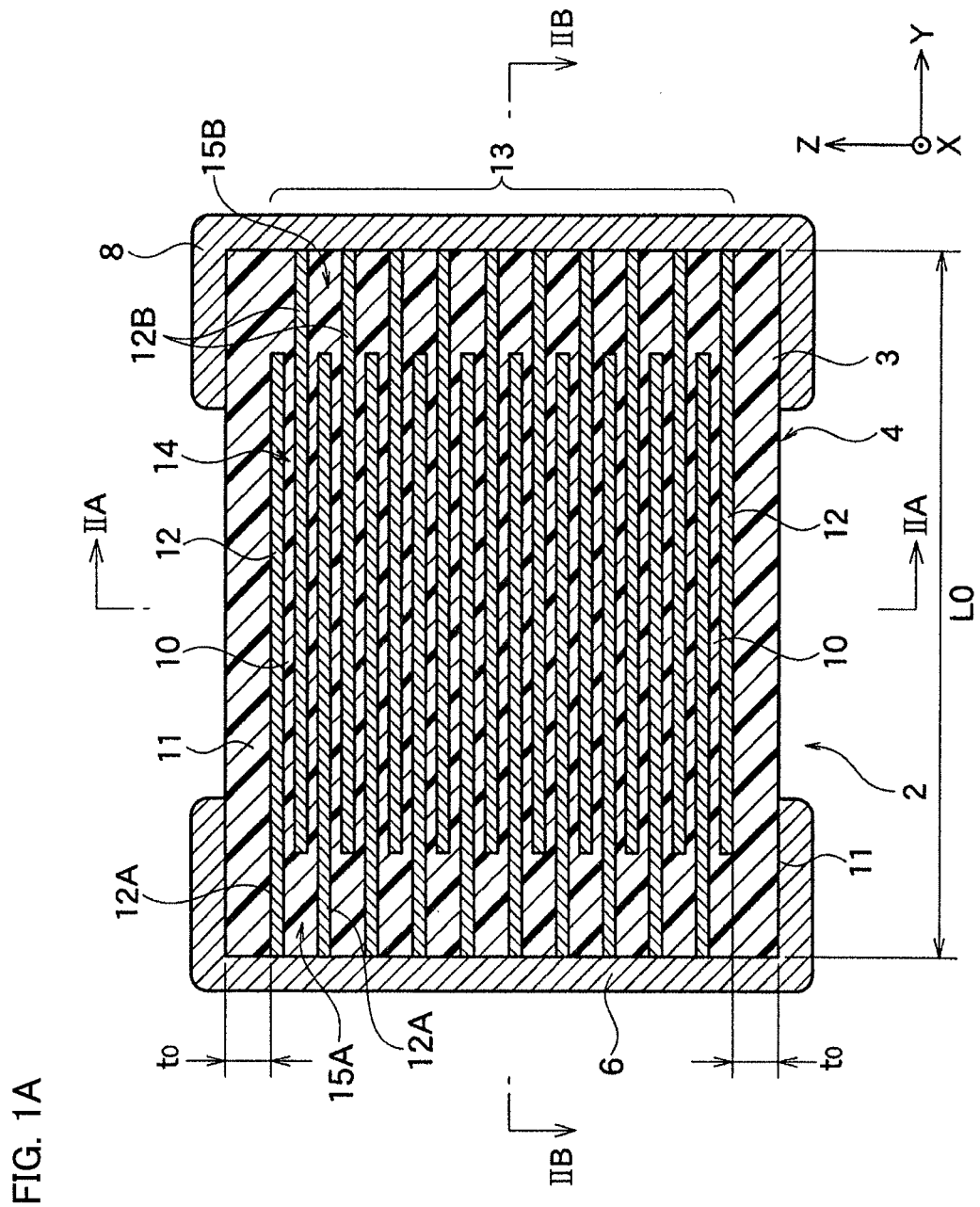

n – TH LAYER n+1 – TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

A method for manufacturing a multilayer ceramic capacitor is disclosed in Patent Document 1 which includes a step of coating and printing an internal electrode that is continuous in a longitudinal direction in a strip shape on a molded continuous dielectric green sheet, a step of successively laminating the dielectric green sheet on which an internal electrode is printed and a continuous dielectric green sheet on which an internal electrode is not printed, a step of cutting the continuous laminate into individuals and forming an insulating layer on a portion on which an external electrode is not attached among the portions on which the internal electrodes are exposed, and step of forming an external electrode on the portion on which the internal electrode is exposed.

However, in the multilayer ceramic capacitor disclosed in Patent Document 1, the external electrode and the insulating layer are formed in different regions from each other, and thus there is a problem that the region in which the external electrode is formed is limited, a sufficient area for soldering at the time of mounting cannot be secured, and the fixing strength or flexural strength of the part decreases.

It is considered to have a structure in which a portion of the external electrode is extended to the side surface of the ceramic sintered body in order to improve the fixing strength or flexural strength of the part, but there is a problem that the insulating layer and the external electrode are hardly sufficiently bonded to each other and the external electrode is peeled off after the plating treatment or the mechanical strength decreases.

Patent Document 1: JP 59-222917 A

SUMMARY OF THE INVENTION

The present invention has been made in view of the above circumstances, and an object thereof is to provide a multilayer electronic component which is able to suppress peeling off of the external electrode after the plating treatment and has an excellent mechanical strength.

Means for Solving Problem

In order to achieve the above object, the multilayer electronic component of the present invention is as follows.

[1] A multilayer electronic component comprising an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, a main component of the insulating layer is constituted by glass containing Si at 25 wt % or more, the external electrode includes glass containing at least Si, the external electrode covers an end portion in the second axial direction of the insulating layer in the side surface, a diffusing layer is present at least at a bonding portion of the insulating layer with the external electrode in the side surface, and a gradient of a concentration of Si is present in the diffusing layer along a direction perpendicular to the bonding portion.

According to the present invention, it is possible to provide a multilayer electronic component which is able to suppress peeling off of the external electrode after the plating treatment and has an excellent mechanical strength by equipping the multilayer electronic component with a predetermined insulating layer, external electrode, and diffusing layer.

As a specific aspect of [1] above, the following aspects are exemplified.

[2] The multilayer electronic component according [1], in which a pair of end surfaces (main surfaces) facing each other in the third axis direction of the element body is respectively equipped with the insulating layer, the external electrode covers an end portion in the second axial direction of the insulating layer in the main surface, and the diffusing layer is present at least at a bonding portion of the insulating layer with the external electrode in the main surface.

[3] The multilayer electronic component according to [1] or [2], in which dD/dGD is 0.003 to 0.3, where dD denotes a thickness of the diffusing layer along a direction perpendicular to the bonding portion and dGD denotes a thickness of the insulating layer present on an inner side in a direction perpendicular to the bonding portion of a site corresponding to the thickness dD.

[4] The multilayer electronic component according to any one of [1] to [3], in which GSi/TSi satisfies $1.0<GSi/TSi\leq15.0$, where GSi denotes an average weight ratio of Si contained in the glass of the insulating layer and TSi denotes an average weight ratio of Si contained in the glass of the external electrode.

[5] The multilayer electronic component according to [4], in which an aggregated portion having glass aggregated is present on the external electrode side of the bonding portion, $0.2<dT1/dGT1$ is satisfied in any cutting plane parallel to the first axis and the second axis, where dT1 denotes a maximum thickness of the aggregated portion along a direction perpendicular to the bonding portion and dGT1 denotes a thickness of the insulating layer present on an inner side in a direction perpendicular to the bonding portion of a site corresponding to the thickness dT1, and $2\leq nA1$ is satisfied, where nA1 denotes the number of interface aggregation present in a region from an end to 100 μm in the second axis direction of the external electrode of the side surface, wherein the interface aggregation denotes the aggregated portion in contact with the insulating layer.

[6] The multilayer electronic component according to [5], in which $0.2 < dT3/dGT3$ is satisfied in any cutting plane parallel to the second axis and the third axis, where dT3 denotes a maximum thickness of the aggregated portion along a direction perpendicular to the bonding portion and dGT3 denotes a thickness of the insulating layer present on an inner side in a direction perpendicular to the bonding portion of a site corresponding to the thickness dT3, and $2 \leq nA3$ is satisfied, where nA3 denotes the number of interface aggregation present in a region from an end to 100 μm in the second axis direction of the external electrode of the main surface, wherein the interface aggregation denotes the aggregated portion in contact with the insulating layer.

In addition, the method for manufacturing a multilayer electronic component for achieving the above object is not particularly limited, but examples thereof may include the following manufacturing method.

[7] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having an internal electrode layer and a dielectric layer alternately laminated by calcining the green chip, a step of obtaining a ceramic sintered body having an insulating layer formed by coating and baking a paste for insulating layer on an end surface in the first axial direction of the element body, a step of forming an external electrode by baking a metal paste on an end surface in the second axial direction of the ceramic sintered body, and a step of subjecting a surface of the external electrode to a plating treatment, in which a main component of the insulating layer is constituted by glass containing Si at 25 wt % or more, the external electrode includes glass containing at least Si, the external electrode covers an end portion in the second axial direction of the insulating layer in an end surface in the first axis direction of the element body, a diffusing layer is present at least at a bonding portion of the insulating layer with the external electrode in an end surface in the first axis direction of the element body, and a gradient of a concentration of Si is present in the diffusing layer along a direction perpendicular to the bonding portion.

BRIEF DESCRIPTION OF THE DRAWINGS

FIG. 1A is a schematic cross-sectional view of the multilayer ceramic capacitor according to an embodiment of the present invention.

FIG. 5Ab is a plan view illustrating a portion of the n+1-th internal electrode pattern layer.

DESCRIPTION OF THE PREFERRED EMBODIMENTS

Figure 1B:
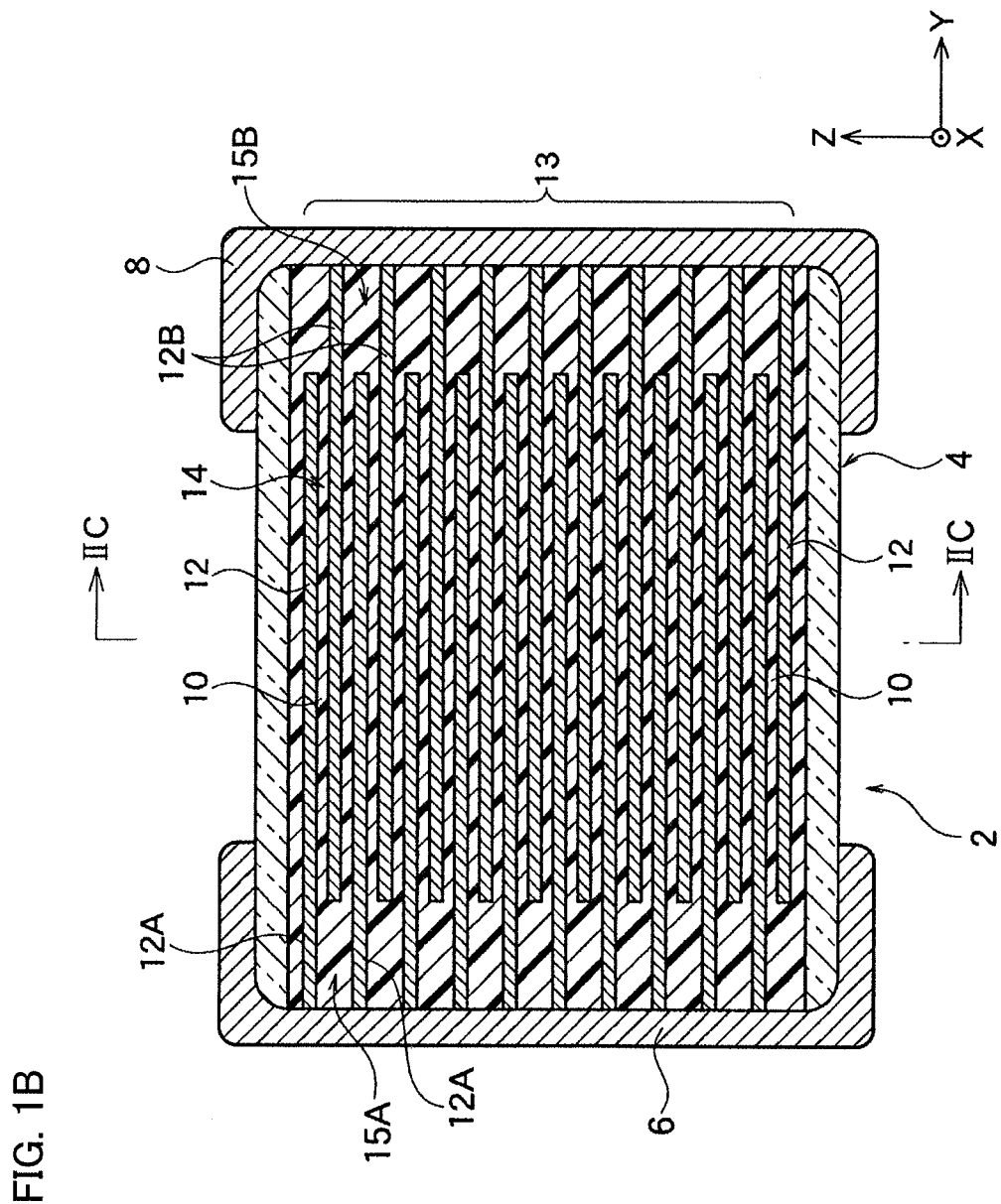
FIG. 1B is a schematic cross-sectional view of the multilayer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

Figure 2A:
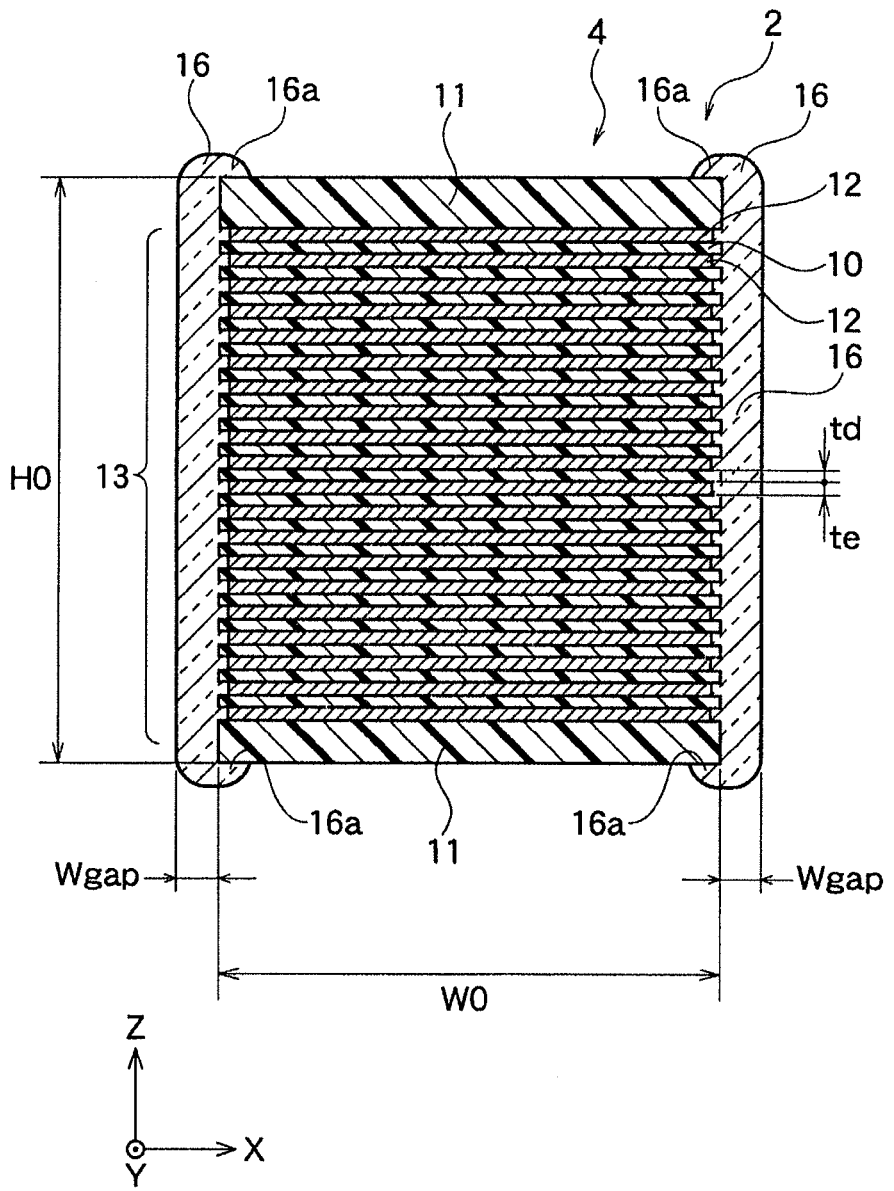
FIG. 2A is a cross-sectional view taken along the line IIA-IIA illustrated in FIG. 1A.

As illustrated in FIG. 1A or FIG. 1B, a multilayer ceramic capacitor 2 according to the present embodiment includes a ceramic sintered body 4, a first external electrode 6, and a second external electrode 8. In addition, as illustrated in FIG. 1B or FIG. 2A, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of A/B is not particularly limited, and it is from 0.980 to 1.020.

In addition to this, examples of an accessory component may include silicon dioxide, aluminum oxide, magnesium oxide, an alkali metal compound, an alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, an alkali metal compound, an alkaline earth metal compound, manganese oxide, a rare earth element oxide, and vanadium oxide as the accessory component.

The number of lamination of the inner dielectric layer 10 and the outer dielectric layer may be appropriately determined in accordance with the application and the like.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more. Incidentally, various kinds of trace components such as P may be contained in Ni or a Ni alloy at about 0.1 wt % or less.

The internal electrode layer 12 may be formed by using a commercially available electrode paste, and the thickness of the internal electrode layer 12 may be appropriately determined in accordance with the application and the like.

As illustrated in FIG. 2A, the both end surfaces in the X-axis direction of the element body 3 is equipped with the insulating layer 16.

Figure 2B:
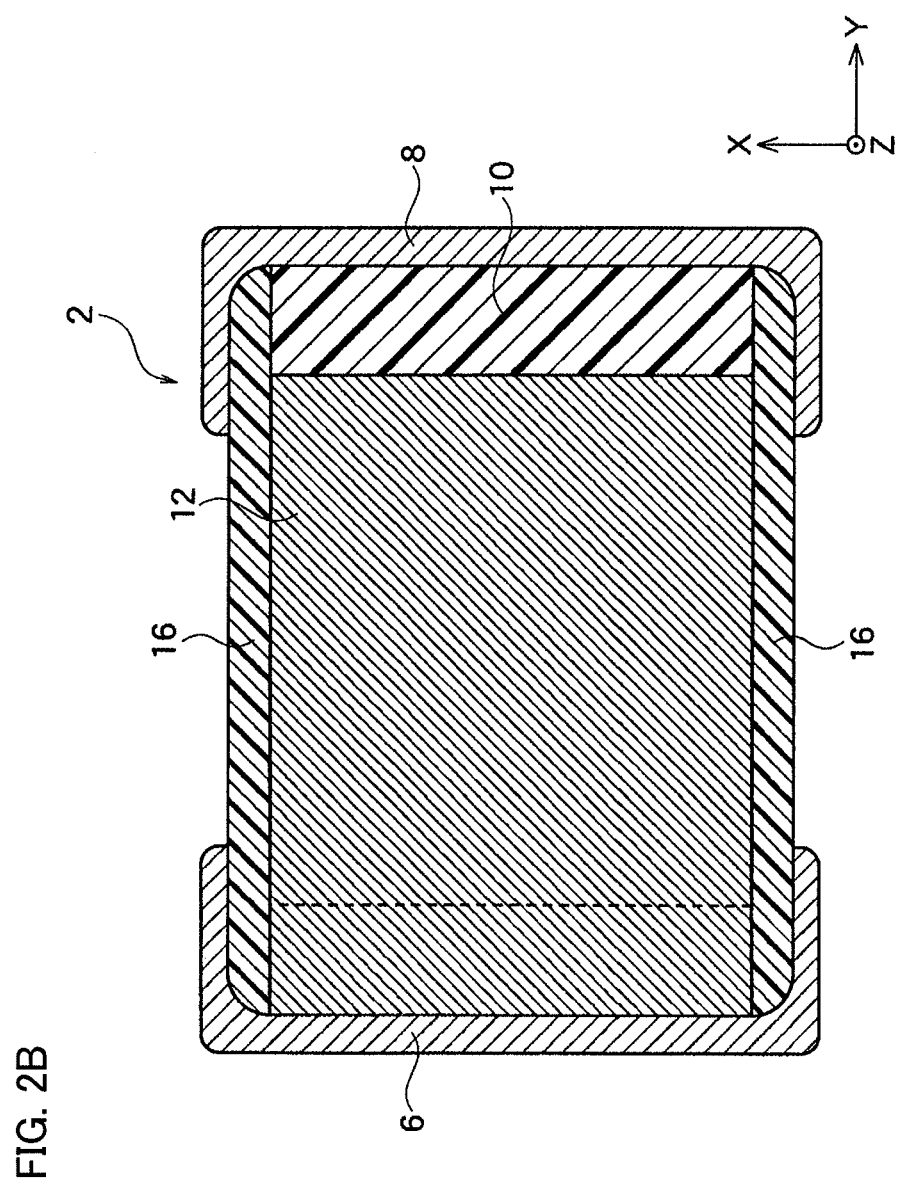
FIG. 2B is a cross-sectional view taken along the line IIB-IIB illustrated in FIG. 1A.
Figure 2C:
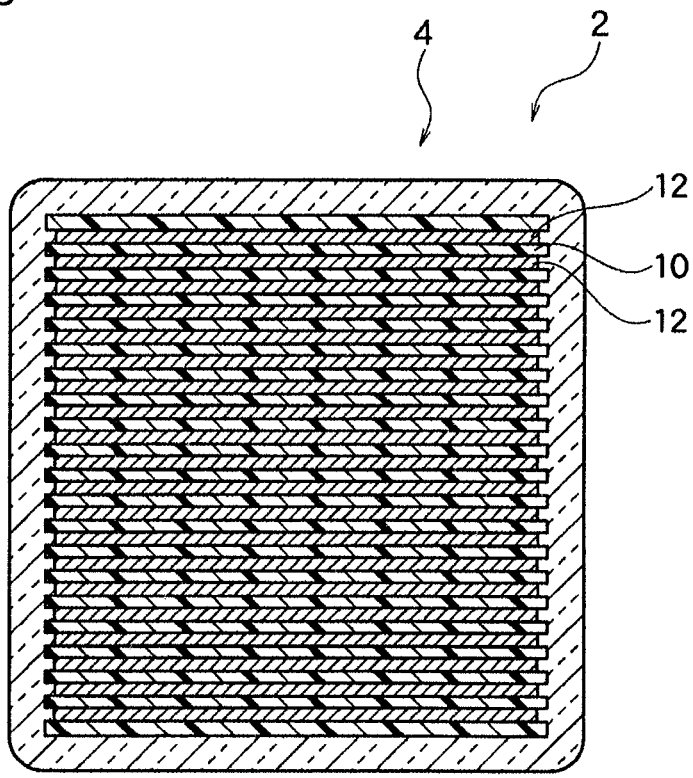
FIG. 2C is a cross-sectional view taken along the line IIC-IIC illustrated in FIG. 1B.
Figure 2C:
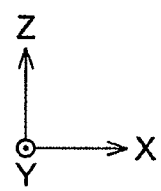

As illustrated in FIG. 1B and FIG. 2C, the both end surfaces in the Z-axis direction of the element body 3 may also be equipped with the insulating layer 16.

Furthermore, the insulating layer 16 may partly cover the end portion in the X-axis direction of the both end surfaces in the Y-axis direction of the element body 3, but it is preferable that the insulating layer 16 does not widely cover the both end surfaces in the Y-axis direction of the element body 3 illustrated in FIG. 1A. This is because it is required that the external electrodes 6 and 8 are formed on the both end surfaces in the Y-axis direction of the element body 3 and connected to the internal electrode layer 12.

In the present embodiment, a reaction phase generated by the diffusion of at least one of the constituents of the insulating layer 16 to the inner dielectric layer 10 may be formed at the interface between the insulating layer 16 and the inner dielectric layer 10. By having a reaction phase at the interface between the insulating layer 16 and the inner dielectric layer 10, the end surface of the element body 3 is embedded in glass and the porosity at the interface can be suppressed to the minimum. This improves the insulating properties of the end surface of the element body 3 and makes it possible to improve the voltage endurance. In addition, by having a reaction phase at the interface between the insulating layer 16 and the dielectric layer, it is possible to improve the adhesive properties at the interface between the insulating layer 16 and the dielectric layer. This suppresses the delamination of the element body 3 and the insulation layer 16 and makes it possible to enhance the bending strength thereof.

With regard to the acknowledgement of reaction phase, for example, the STEM-EDS analysis of the Si element at the interface between the dielectric layer and insulating layer 16 of the ceramic sintered body 4 is conducted to obtain the mapping data of the Si element, and the place at which the Si element is present is acknowledged as the reaction phase.

In the present embodiment, as illustrated in FIG. 2B, the external electrodes 6 and 8 cover the end portion in the Y-axis direction of the insulating layer 16 on the end surface in the X-axis direction of the element body 3.

In addition, in the present embodiment, as illustrated in FIG. 1B, the external electrodes 6 and 8 may cover the end portion in the Y-axis direction of the insulating layer 16 on the end surface in the Z-axis direction of the element body 3.

The main component of the insulating layer 16 of the present embodiment is constituted by glass containing Si at 25 wt % or more. This makes it possible to suppress the peeling off of the external electrodes 6 and 8. It is considered that this is because the plating resistance of the insulating layer 16 is improved as Si contained in the glass of the main component of the insulating layer 16 increases and thus the degradation due to plating can be suppressed. In addition, it is possible to form a diffusing layer 18a to be described later by setting Si contained in the glass of the main component of the insulating layer 16 to 25 wt % or more. This strengthens bonding of the insulating layer 16 with the external electrodes 6 and 8 so that they can withstand the stop deflection test. From the above point of view, the main component of the insulating layer 16 of the present embodiment is preferably constituted by glass containing Si at from 25 wt % to 70 wt %.

Incidentally, the main component of the insulating layer 16 refers to a component that is contained in the insulating layer 16 at 40 vol % or more, and preferably the main component of the insulating layer 16 refers to a component that is contained in the insulating layer 16 at 60 vol % or more.

The insulating layer 16 of the present embodiment may contain Mg, Ca, Sr, Ba, Li, Na, K, Ti, Zr, B, P, Zn, and Al in addition to Si.

In addition, the fixing strength is improved by constituting the insulating layer 16 by a glass component. It is considered that this is because a reaction phase is formed at the interface between the glass and the element body 3 and thus the adhesive properties between the glass and the element body 3 is superior to other insulating materials.

Furthermore, glass exhibits higher insulating properties as compared to a ceramic. Hence, it is possible to decrease the incidence rate of short circuit even when the distance between the external electrodes 6 and 8 facing each other is decreased in a case in which the main component of the insulating layer 16 is constituted by glass as compared to a case in which the main component of the insulating layer 16 is a ceramic. Accordingly, it is possible to decrease the incidence rate of short circuit even when the external electrodes 6 and 8 are configured to widely cover the Y-axis direction end portion of the X-axis direction end surface and the Y-axis direction end portion of the Z-axis direction end surface of the ceramic sintered body 4 in a case in which the main component of the insulating layer 16 is constituted by glass as compared to a case in which the main component of the insulating layer 16 is a ceramic. This effect is more remarkable in a case in which the insulating layer 16 is also formed on the entire surface of the end surface in the Z-axis direction of the element body 3.

The softening point of the glass contained in the insulating layer 16 of the present embodiment is preferably from 600° C. to 950° C. This makes it possible to prevent the grain growth of the ceramic particles in the dielectric layer when the insulating layer 16 is baked and to suppress the degradation of the properties such as reliability. From the above point of view, the softening point of the glass contained in the insulating layer 16 of the present embodiment is more preferably from 600° C. to 850° C.

The components other than the glass contained in the insulating layer 16 of the present embodiment are not particularly limited, and for example, the insulating layer 16 may contain a ceramic filler or $BaTiO_3$, $CaTiO_3$, $Al_2O_3$, $CaZrO_3$, MgO, $ZrO_2$, $Cr_2O_3$, and CoO.

By covering the end surface of the element body 3 with the insulating layer 16, not only the insulating properties are enhanced but also the durability and moisture resistance to the environmental impact from the outside are enhanced. In addition, a side gap is formed by covering the end surface in the X-axis direction of the element body 3 with the insulating layer 16, and thus the width of the side gap is small and a uniform insulating layer 16 can be formed.

Figure 3A:
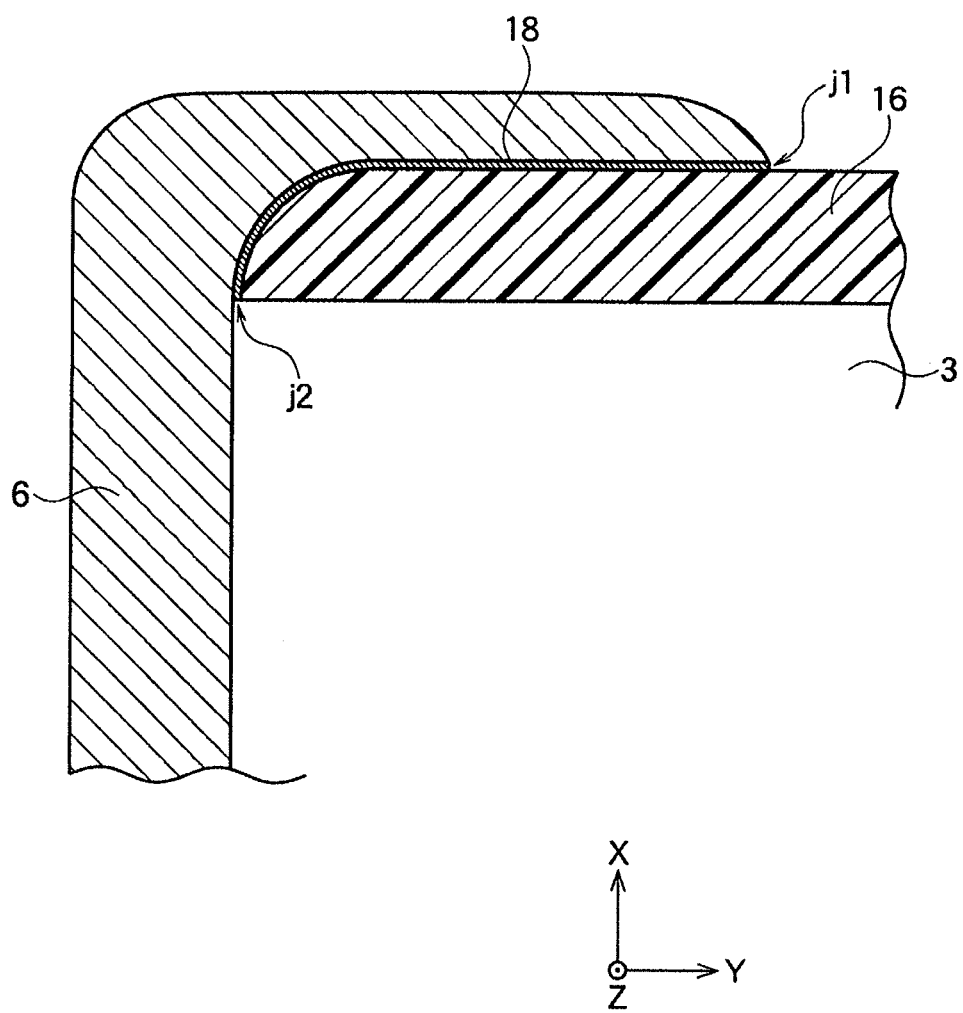
FIG. 3A is a fragmentary cross-sectional view of FIG. 2B.
Figure 3B:
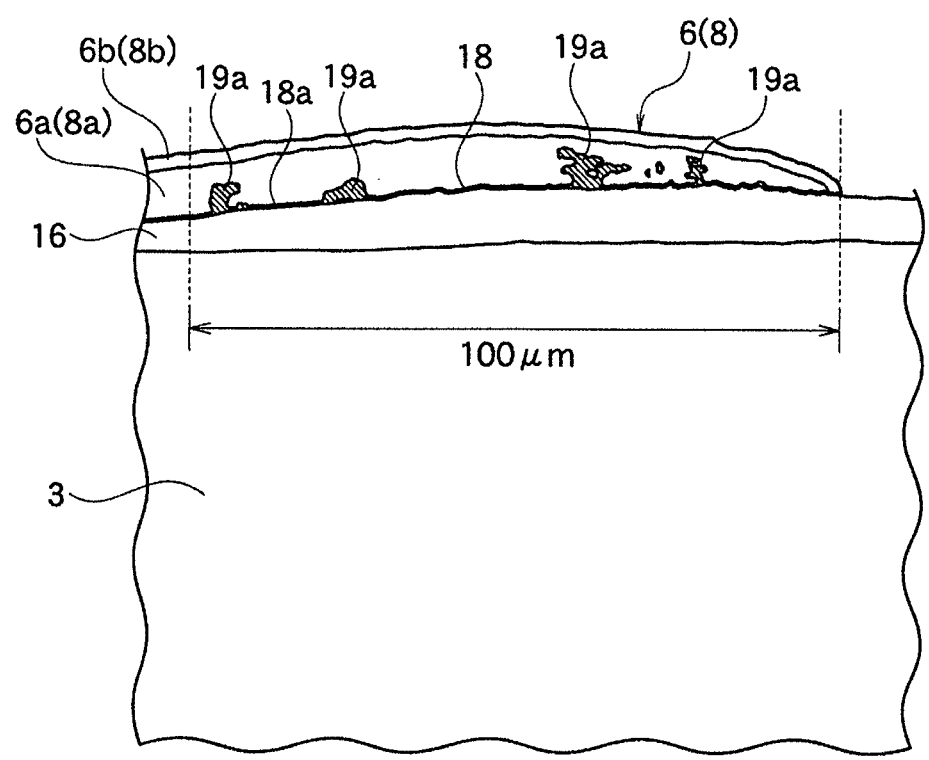
FIG. 3B is a fragmentary cross-sectional view of FIG. 3A.
Figure 3C:
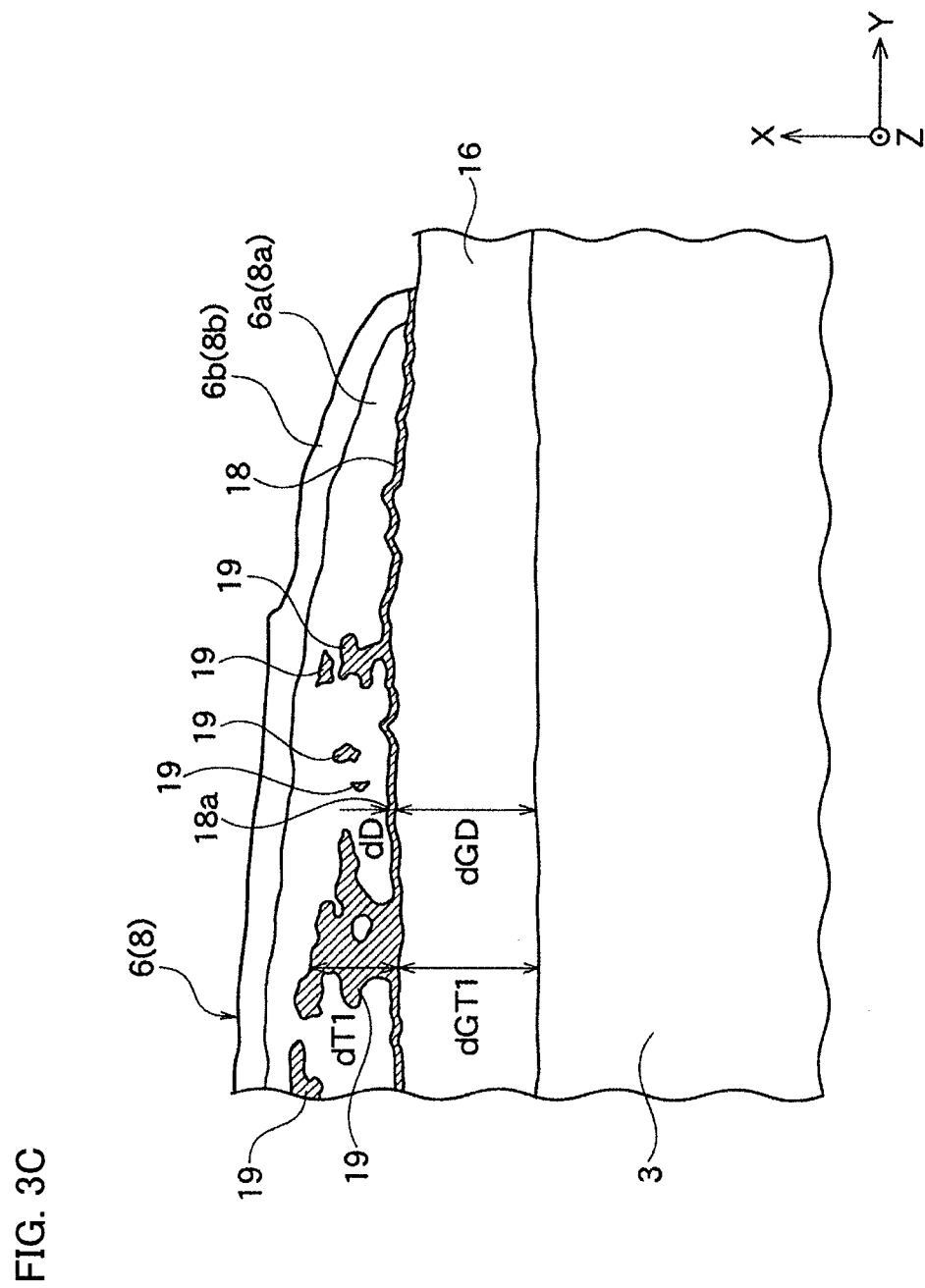
FIG. 3C is a fragmentary cross-sectional view of FIG. 3B.

As illustrated in FIG. 3B and FIG. 3C, the external electrodes 6 and 8 have electrode films 6a and 8a and covering layers 6b and 8b to cover the electrode films 6a and 8a. The covering layers 6b and 8b are formed by a plating treatment. The electrode films 6a and 8a of the present embodiment include glass containing at least Si. This makes it possible to form a diffusing layer 18a to be described later and to suppress peeling off of the external electrodes 6 and 8 after the plating treatment, and this strengthens bonding of the external electrodes 6 and 8 with the insulating layer 16 and provides a mechanical strength capable of withstanding the stop deflection test. From the above point of view, the Si content in the glass of the electrode films 6a and 8a is preferably from 1 wt % to 65 wt %.

In addition, the content of glass in the electrode films 6a and 8a is preferably from 5 wt % to 40 wt %.

Other components contained the electrode films 6a and 8a are not particularly limited, and for example, it is possible to use Cu, Ni, Ag, Pd, Pt, Au, or an alloy thereof and a known conductive material such as a conductive resin.

The thickness of the external electrodes 6 and 8 may be appropriately determined in accordance with the application and the like.

In the present embodiment, it is preferable that GSi/TSi satisfies 1.0<GSi/TSi≤15.0, where GSi denotes the average weight ratio of Si contained in the glass of the insulating layer 16 and TSi denotes the average weight ratio of Si contained in the glass of the external electrodes 6 and 8.

In a case in which GSi/TSi is 1.0<GSi/TSi≤15.0, it is possible to allow the diffusing layer 18a to be described later to exist, to further increase the electrostatic capacity as compared to a case in which GSi/TSi is 1.0 or less, and to improve the strength of the external electrode. The glass in the insulating layer 16 has a lower softening point than the glass in the external electrodes 6 and 8 in a case in which GSi/TSi is 1.0 or less, and thus the insulating layer 16 is softened when the external electrodes 6 and 8 are baked, the glass component of the insulating layer 16 is diffused to the dielectric layer, and the electrostatic capacity tends to decrease.

In addition, it is possible to increase the electrostatic capacity and to obtained favorable results in the limit deflection test in a case in which GSi/TSi is 1.0<GSi/TSi≤15.0 as compared to a case in which GSi/TSi is greater than 15.0.

The softening point of the glass contained in the insulating layer 16 tends to increase too high as compared to that of the glass contained in the external electrodes 6 and 8 in a case in which GSi/TSi is greater than 15.0. As a result, it is required to bake the external electrodes 6 and 8 at a temperature higher than the original proper baking temperature of the external electrodes 6 and 8 in order to form a diffusing layer 18a to be described later at the bonding portion 18 of the insulating layer 16 with the external electrodes 6 and 8, and thus the glass contained in the external electrodes 6 and 8 is excessively diffused to the end surface of the ceramic sintered body 4. Hence, a variation is caused in bonding of the internal electrode layer 12 with the external electrodes 6 and 8 and the electrostatic capacity tends to decrease.

From the above point of view, GSi/TSi is more preferably from 2.0 to 8.0.

As illustrated in FIG. 3A to FIG. 3C, in the present embodiment, the diffusing layer 18a is present at least at the bonding portion 18 of the insulating layer 16 with the external electrodes 6 and 8 on the end surface in the X-axis direction of the element body 3.

Figure 3D:
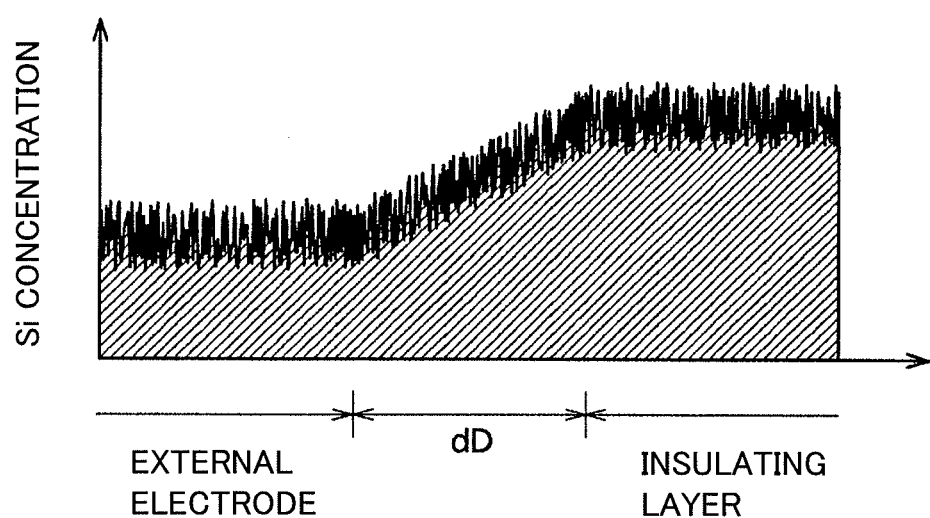
FIG. 3D is a graph illustrating the Si concentration in the external electrode, bonding portion, and insulating layer of the multilayer ceramic capacitor according to an embodiment of the present invention.

The horizontal axis in FIG. 3D indicates the distance in a direction from the external electrodes 6 and 8 toward the insulating layer 16 in the vicinity of the bonding portion 18 of the insulating layer 16 with the external electrodes 6 and 8 illustrated in FIG. 3A to FIG. 3C. In addition, the vertical axis in FIG. 3D indicates the concentration of Si.

The portion indicated by dD in FIG. 3D is a portion corresponding to the diffusing layer 18a, and a concentration gradient of Si which increases along the direction from the external electrodes 6 and 8 toward the insulating layer 16 is present in the diffusing layer 18a.

The concentration gradient of Si in the diffusing layer 18a of the present embodiment is preferably from 0.1 μm to 5.0 μm thick along the direction perpendicular to the bonding portion 18 of the insulating layer 16 with the external electrodes 6 and 8. This enhances the bonding strength of the insulating layer 16 with the external electrodes 6 and 8 and makes it possible to provide a high flexural strength to an insulating layer containing glass as a main component. However, it is expected that the thickness of the external electrodes 6 and 8 is also simultaneously thick when the diffusing layer is thick, and thus it is concerned that the capacity density of the entire part is lowered, and from the above point of view, the concentration gradient of Si is more preferably from 0.1 μm to 2.0 μm thick along the direction perpendicular to the bonding portion 18 of the insulating layer 16 with the external electrodes 6 and 8.

The method for measuring the concentration of Si is not particularly limited, and, for example, the concentration of Si can be measured by elemental analysis or line analysis such as cross-sectional TEM (STEM)-EDX.

Incidentally, the diffusing layer 18a may also be present at least at the bonding portion 18 of the insulating layer 16 with the external electrodes 6 and 8 on the end surface in the Z-axis direction of the element body 3.

As illustrated in FIG. 3C, in the present embodiment, an aggregated portion 19 in which the glass is aggregated is present on the external electrodes 6 and 8 side of the bonding portion 18 of the insulating layer 16 with the external electrodes 6 and 8 on the end surface in the X-axis direction of the element body 3. Incidentally, the aggregated portion 19 may include the diffusing layer 18a.

As illustrated in FIG. 3C, 0.2<dT/dGT is satisfied in an arbitrary cutting plane parallel to the X-axis and the Y-axis, where dT denotes the maximum thickness of the aggregated portion 19 along the direction perpendicular to the bonding portion 18 and dGT denotes the thickness of the insulating layer 16 present on the inner side in the direction perpendicular to the bonding portion 18 of the site corresponding to the thickness dT, and the aggregated portion 19 in contact with the insulating layer 16 is adopted as the interface aggregation 19a.

In the present embodiment, as illustrated in FIG. 3B, it is preferable to be 2≤nA1, where nA1 denotes the number of interface aggregation 19a present in the region from the end to 100 μm in the Y-axis direction of the external electrodes 6 and 8 on the end surface in the X-axis direction of the element body 3. This makes it possible to withstand the stop deflection test and to increase the electrostatic capacity, and this improves the strength of the external electrodes 6 and 8. The bonding of the insulating layer 16 with the external electrodes 6 and 8 is stronger as the number of interface aggregation 19a increases, and thus the strength of the external electrodes 6 and 8 is improved.

From the above point of view, nA1 is more preferably from 4 to 10, and it is preferable that the aggregated portion 19 in which dT1/dGT1 is from 0.2 to 0.5 is adopted as the interface aggregation 19a.

In addition, although it is not illustrated, the aggregated portion 19 in which the glass is aggregated may also be present at the bonding portion 18 of the insulating layer 16 with the external electrodes 6 and 8 on the end surface in the Z-axis direction of the element body 3.

In this case, 0.2<dT3/dGT3 is satisfied in an arbitrary cutting plane parallel to the Y-axis and the Z-axis, where dT3 denotes the maximum thickness of the aggregated portion 19 along the direction perpendicular to the bonding portion 18 and dGT3 denotes the thickness of the insulating layer 16 present on the inner side in the direction perpendicular to the bonding portion 18 of the site corresponding to the thickness dT3, and the aggregated portion 19 in contact with the insulating layer 16 is adopted as the interface aggregation 19a.

In the present embodiment, it is preferable to be 2≤nA3, where nA3 denotes the number of interface aggregation 19a present in the region from the end to 100 μm in the Y-axis direction of the external electrodes 6 and 8 on the end surface in the Z-axis direction of the element body 3. This makes it possible to withstand the stop deflection test and to increase the electrostatic capacity, and this improves the strength of the external electrodes 6 and 8. The bonding of the insulating layer 16 with the external electrodes 6 and 8 is stronger as the number of interface aggregation 19a increases, and thus the strength of the external electrodes 6 and 8 is improved.

From the above point of view, nA3 is more preferably from 4 to 10, and it is preferable that the aggregated portion 19 in which dT3/dGT3 is from 0.2 to 0.5 is adopted as the interface aggregation 19a.

nA1 and nA3 can be controlled by adjusting the amount of glass contained in the external electrodes 6 and 8 or by adjusting the temperature or time at the time of baking the external electrodes 6 and 8.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

The shape or size of the element body 3 may be appropriately determined in accordance with the purpose or application, but it is preferable that the width W0 in the X-axis direction is from 0.1 mm to 1.6 mm, the length L0 in the Y-axis direction is from 0.2 mm to 3.2 mm, and the height H0 in the Z-axis direction is from 0.1 mm to 1.6 mm.

According to the manufacturing method of the present embodiment to be described later, it is possible to improve the acquisition capacity as compared to that in the prior art. At this time, the effect is more remarkable when the size of the element body 3 is the size described above. From the above point of view, the size of the element body 3 of the present embodiment is preferably as follows. The width W0 in the X-axis direction is from 0.1 mm to 0.5 mm, the length L0 in the Y-axis direction is from 0.2 mm to 1.0 mm, and the height H0 in the Z-axis direction is from 0.1 mm to 0.5 mm.

In the present embodiment, the end surface in the X-axis direction of the element main body 3 may be mirror-polished, or the end portion in the X-axis direction of the internal electrode layer 12 sandwiched between the inner dielectric layers 10 adjacent in the laminating direction (Z-axis direction) may be recessed on the end surface in the X-axis direction of the element body 3, namely, at the predetermined retraction distance from the X-axis direction end portion to the inner side of the inner dielectric layer 10.

The retraction of the X-axis direction end portion of the internal electrode layer 12 is formed, for example, by the difference in sintering shrinkage factor between the material to form the internal electrode layer 12 and the material to form the inner dielectric layer 10.

In the present embodiment, as illustrated in FIG. 2A, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The average of the width Wgap is preferably from 1 μm to 30 μm. This decreases the influence of the thermal expansion coefficient of the insulating layer 16 and this makes it possible to suppress the structural defect due to the difference in thermal expansion coefficient between the element body 3 and the insulation layer 16.

The widths Wgap of both sides in the X-axis direction of the ceramic sintered body 4 may be the same as or different from each other.

In addition, the average of the above width Wgap is significantly small as compared to the width W0 of the element body 3. In the present embodiment, it is possible to significantly decrease the width Wgap as compared to the prior art, moreover, the retraction distance of the internal electrode layer 12 is sufficiently small. Hence, in the present embodiment, it is possible to obtain a multilayer ceramic capacitor 2 having a great capacity while being compact.

Incidentally, the width W0 of the element body 3 coincides with the width along the X-axis direction of the inner dielectric layer 10.

By setting Wgap to be within the above range, a decrease in electrostatic capacity is small even when the ceramic sintered body 4 is more compact as well as cracking hardly occurs.

As illustrated in FIG. 3C, it is preferable that dD/dGD is from 0.003 to 0.3, where dD denotes the thickness of the diffusing layer 18a of the present embodiment along the direction perpendicular to the bonding portion and dGD denotes the thickness of the insulating layer 16 present on the inner side in the direction perpendicular to the bonding portion of the site corresponding to the thickness dD.

The bonding of the insulating layer 16 with the external electrodes 6 and 8 is sufficient and the results for the limit deflection test are favorable in a case in which dD/dGD is 0.003 or more as compared to a case in which dD/dGD is less than 0.003.

The amount of the Si component contained in the insulating layer 16 is great, it is appropriate, the strength of the insulating layer 16 itself is high, and the results for the limit deflection test are favorable in a case in which dD/dGD is 0.3 or less as compared to a case in which dD/dGD is greater than 0.3.

Incidentally, the thickness dD of the diffusing layer 18a can be controlled by adjusting the oxygen partial pressure, temperature, or time when a metal paste to be the electrode films 6a and 8a of the external electrodes 6 and 8 is baked.

As illustrated in FIG. 3A, the length along the bonding portion 18 from the end portion (the portion indicated by an arrow j1) of the external electrodes 6 and 8 of the bonding portion 18 to the end portion (the portion indicated by an arrow j2) of the insulating layer 16 of the bonding portion 18 is denoted as J. The length J is not particularly limited, but it is preferably from 50 μm to 200 μm. This makes it possible to improve the fixing strength or flexural strength of the part.

The length J of the bonding portion formed on the end surface in the X-axis direction of the element body 3 is not necessarily uniform along the Z-axis direction but may be a bit varied.

In addition, the length J of the bonding portion formed on the end surface in the Z-axis direction of the element body 3 is also not necessarily uniform along the X-axis direction but may be a bit varied.

Furthermore, the respective lengths J of the bonding portion 18 at four places of the multilayer ceramic capacitor 2 may be the same as or different from one another.

The ratio of the thickness td of the inner dielectric layer 10 to the thickness to of the internal electrode layers 12 is not particularly limited, and it is preferable that td/te is from 2 to 0.5. In addition, the ratio of the thickness to of the exterior region 11 to the height H0 of the element body 3 is not particularly limited, and it is preferable that to/H0 is from 0.01 to 0.05.

Method for Manufacturing Multilayer Ceramic Capacitor

Next, a method for manufacturing the multilayer ceramic capacitor 2 as an embodiment of the present invention will be specifically described.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μm or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dioctyl phthalate or benzyl butyl phthalate, adipic acid, an ester of phosphoric acid, and a glycol.

Next, a paste for internal electrode layer is prepared in order to manufacture an internal electrode pattern layer 12a to constitute the internal electrode layers 12 illustrated in FIG. 1A after calcination. The paste for internal electrode layer is prepared by kneading a conductive material composed of various kinds of conductive metals or alloys described above with the organic vehicle described above.

The metal paste (paste for external electrode) to constitute the external electrodes 6 and 8 illustrated in FIG. 1A after calcination may be prepared in the same manner as the paste for internal electrode layer described above.

Figure 4:
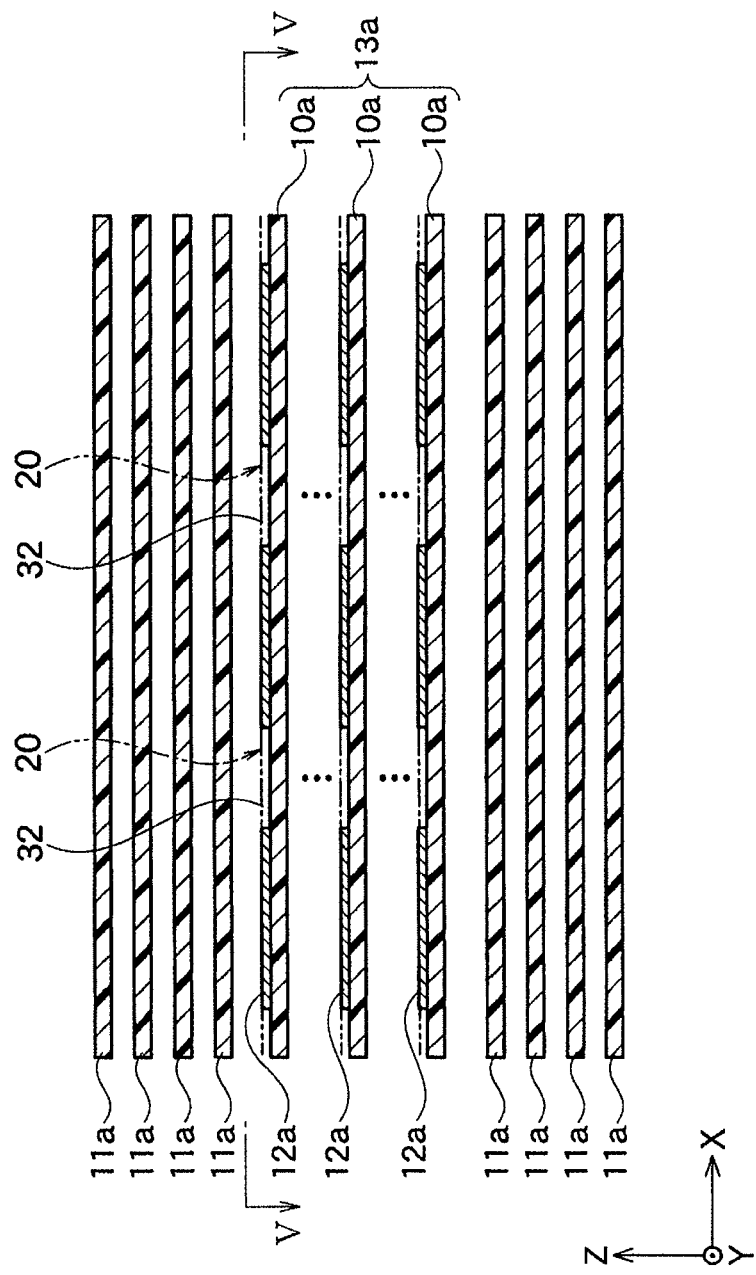
FIG. 4 is a schematic cross-sectional view illustrating the step of laminating a green sheet in the manufacturing process of a multilayer ceramic capacitor illustrated in FIG. 1A.

The inner green sheet 10a and the internal electrode pattern layer 12a are alternately laminated as illustrated in FIG. 4 by using the paste for inner green sheet and the paste for internal electrode layer prepared in the above to manufacture an internal laminate 13a. In addition, after the internal laminate 13a is manufactured, the outer green sheet 11a is formed thereon by using the paste for outer green sheet, and the resultant is pressurized in the laminating direction to obtain a green laminate.

Incidentally, as a method for manufacturing the green laminate, in addition to the above, a green laminate may be obtained by alternately laminating a predetermined number of the inner green sheet 10a and the internal electrode pattern layer 12a directly on the outer green sheet 11a and pressurizing the resultant in the laminating direction.

Specifically, first, the inner green sheet 10a is formed on a carrier sheet (for example, a PET film) as a support by a doctor blade method. The inner green sheet 10a is dried after being formed on the carrier sheet.

Next, as illustrated in FIG. 4, the internal electrode pattern layer 12a is formed on the surface of the inner green sheet 10a by using the paste for internal electrode layer to obtain the inner green sheet 10a having the internal electrode pattern layer 12a.

Figure 5A:
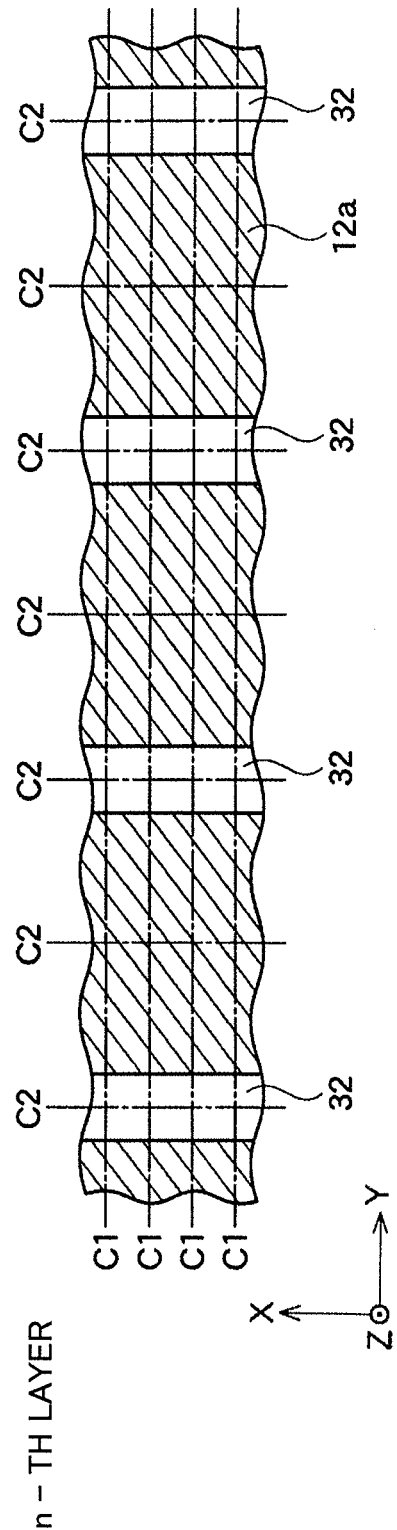
FIG. 5Aa is a plan view illustrating a portion of the n-th internal electrode pattern layer taken along the line V-V illustrated in FIG. 4.
Figure 5A:
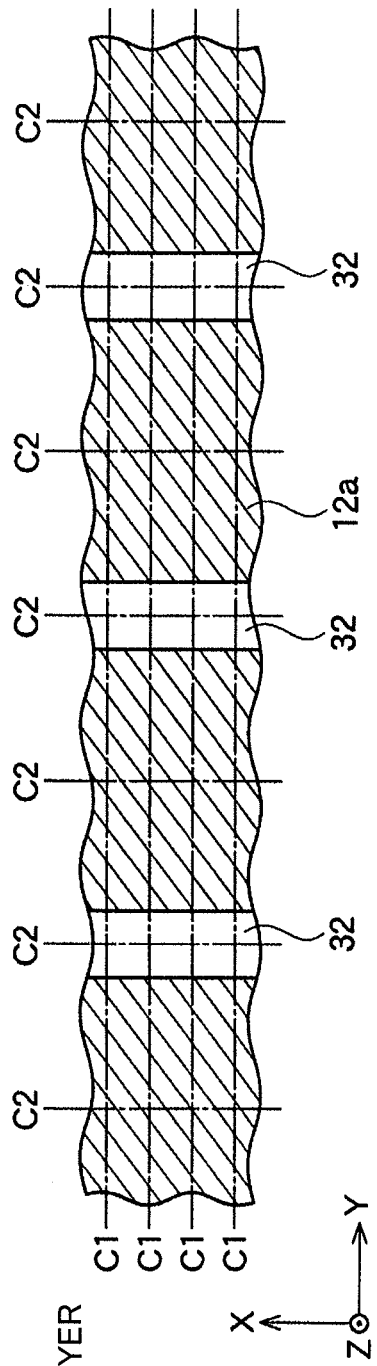

At this time, as illustrated in FIG. 5Aa, a gap 32 of the internal electrode pattern layer 12a is formed in the Y-axis direction and a continuous flat internal electrode pattern layer 12a is formed in the X-axis direction at the n-th layer.

Next, as illustrated in FIG. 5Ab, the gap 32 of the internal electrode pattern layer 12a is formed in the Y-axis direction and a continuous flat internal electrode pattern layer 12a is formed in the X-axis direction at the (n+1)-th layer as well. At this time, the gaps 32 of the internal electrode pattern layer of the n-th layer and the (n+1)-th layer are formed so as not to overlap each other in the Z axis direction of the laminating direction.

In this manner, the internal laminate 13a is manufactured by laminating a plurality of the inner green sheet 10a having the internal electrode pattern layer 12a, an appropriate number of the outer green sheets 11a is then formed above and below the internal laminate 13a by using the paste for outer green sheet, and the resultant is pressurized in the laminating direction to obtain a green laminate.

Next, the green laminate is cut along a cutting plane C1 and a cutting plane C2 in FIG. 5Aa and FIG. 5Ab to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12a at the n-th layer cuts the gap of the internal electrode pattern layer 12a. In addition, the cutting plane C2 which has cut the internal electrode pattern layer 12a at the n-th layer cuts the gap of the internal electrode pattern layer 12a at the (n+1)-th layer.

By obtaining the green chip by such a cutting method, the n-th internal electrode pattern layer 12a of the green chip is configured to be exposed on one cutting plane and not to be exposed on the other cutting plane in the cutting plane C2 of the green chip. In addition, the (n+1)-th internal electrode pattern layer 12a of the green chip has a configuration in which the internal electrode pattern layer 12a is not exposed on the other cutting plane on which the internal electrode pattern layer 12a is exposed at the n-th layer and the internal electrode pattern layer 12a is exposed on one cutting plane on which the internal electrode pattern layer 12a is not exposed at the n-th layer on the cutting plane C2 of the green chip.

Furthermore, the internal electrode pattern layer 12a is configured to be exposed in all of the layers on the cutting plane C1 of the green chip.

In addition, the method for forming the internal electrode pattern layer 12a is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200° C. to 400° C.

In the present embodiment, the calcination step is conducted in a reducing atmosphere, and the annealing step is conducted in a neutral or weakly oxidizing atmosphere. Other calcination conditions or other annealing conditions may be known conditions, and for example, the retention temperature for calcination is from 1000° C. to 1300° C., and the retention temperature for annealing is from 500° C. to 1100° C.

The binder removal step, the calcination step, and the annealing step may be conducted continuously or independently.

A corner R may be formed at the corner portion of the element body 3 obtained as described above by a barrel if necessary.

In addition, the end surface of the element body 3 may be polished, for example, by barrel polishing or sandblasting if necessary.

Incidentally, it is preferable that the end surface in the X-axis direction of the element body 3 is mirror-polished by lapping. This makes it possible to remove the outgrowth and the like of the internal electrode caused at the time of cutting and to decrease the short circuit defects.

Next, the insulating layer 16 is formed by coating and baking the paste for insulating layer on the entire surface of both end surfaces in the X-axis direction of the element body 3, whereby the ceramic sintered body 4 illustrated in FIG. 1A is obtained. In the case of coating the paste for insulating layer, the paste may be coated not only on the entire surface of the both end surfaces in the X-axis direction of the element body 3 but also on the entire surface of the both end surfaces in the Z-axis direction of the element body 3. In addition, the paste may be coated on the both end portions in the X-axis direction of the both end surfaces in the Z-axis direction of the element body 3 and/or the both end portions in the X-axis direction of the both end surfaces in the Y-axis direction of the element body 3.

In the case of constituting the insulating layer 16 by glass, this paste for insulating layer may be obtained, for example, by kneading the raw material for glass described above, a binder containing ethyl cellulose as the main component, and terpineol and acetone of the dispersion medium by a mixer.

The method for coating the paste for insulating layer on the element body 3 is not particularly limited, and examples thereof may include methods such as dipping, printing, coating, vapor deposition, and spraying.

The ceramic sintered body 4 is obtained by coating the paste for insulating layer on the element body 3, drying, subjecting to the binder removal treatment, and baking the paste.

Incidentally, the baking temperature of the paste for insulating layer is preferably a temperature higher than the softening point of the glass contained in the paste for insulating layer by preferably from 0° C. to 100° C. and more preferably from 10° C. to 50° C.

The glass component that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

The both end surfaces in the Y-axis direction and/or the both end surfaces in the Z-axis direction of the ceramic sintered body 4 obtained as described above may be polished, for example, by barrel polishing or sandblasting if necessary.

Next, the metal paste is coated and baked on the both end surfaces in the Y-axis direction of the ceramic sintered body 4 on which the insulating layer 16 is baked to form the metal paste-baked film to be the electrode films 6a and 8a of the external electrodes 6 and 8.

The method for forming the electrode films 6a and 8a of the external electrodes 6 and 8 is not particularly limited, and it is possible to use an appropriate method such as coating and baking of the metal paste, plating, vapor deposition, or sputtering.

Incidentally, when the metal paste is coated on the end surface in the Y-axis direction of the ceramic sintered body 4 through dipping, it is preferable to conduct dipping such that the metal paste spreads to the end surface in the X-axis direction and the end surface in the Z-axis direction of the ceramic sintered body 4 as well. The spreading width in the Y-axis direction is preferably from 100 μm to 200 μm. The spreading width can be controlled by adjusting the viscosity of the metal paste or the dipping conditions.

The baking temperature of the metal paste is preferably a temperature higher than the temperature at which the formation of the diffusing layer 18a starts by from 0° C. to 50° C. or a temperature higher than the softening point of the glass contained in the external electrodes 6 and 8 by from 0° C. to 50° C.

Incidentally, the temperature at which the formation of the diffusing layer 18a starts is not particularly limited, but is from 600° C. to 850° C.

In addition, covering layers 6b and 8b are formed on the surface of the electrode films 6a and 8a of the external electrodes 6 and 8 by plating.

The formation of the external electrodes 6 and 8 may be conducted after the formation of the insulating layer 16 or may be simultaneously conducted with the formation of the insulating layer 16, and preferably it is conducted after the formation of the insulating layer 16.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

In addition, in the present embodiment, the insulating layer 16 is formed on the element body 3 by baking the paste for insulating layer on the element body 3 after being subjected to the calcination. By employing this structure, it is possible to improve the moisture resistance of the electronic part and to improve the durability to a change of the external environmental such as a thermal shock or a physical shock.

The embodiments of the present invention have been described, but the present invention is not limited to the embodiments described above in any way and may be variously modified within the scope of the present invention.

Figure 5B:
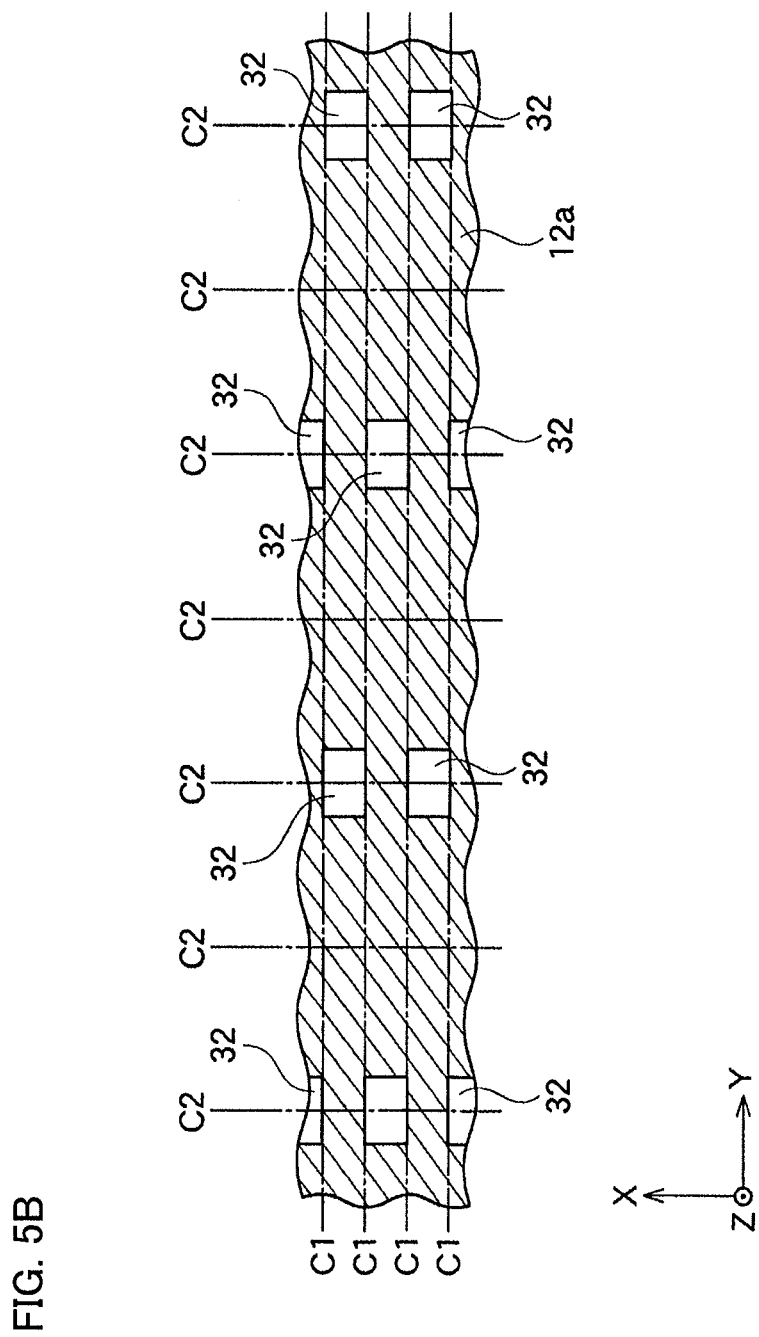
FIG. 5B is a plan view illustrating a portion of the internal electrode pattern layer taken along the line V-V illustrated in FIG. 4.

For example, the internal electrode pattern layer 12a may be a pattern having the gap 32 of the grid-like internal electrode pattern layer 12a as illustrated in FIG. 5B in addition to the pattern illustrated in FIG. 5Aa and FIG. 5Ab.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples (multilayer ceramic capacitor 2) of sample No. 1 to sample No. 12 were fabricated as follows.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

The inner green sheet 10a was formed on a PET film by using the paste for inner green sheet prepared in the above so as to have a thickness after drying of 0.9 μm. Subsequently, the internal electrode pattern layer 12a was printed thereon in a predetermined pattern by using the paste for internal electrode layer, thereby obtaining the inner green sheet 10a having the internal electrode pattern layer 12a.

As illustrated in FIG. 4, the internal laminate 13a was manufactured by laminating the inner green sheet 10a having the internal electrode pattern layer 12a, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Figure 6A:
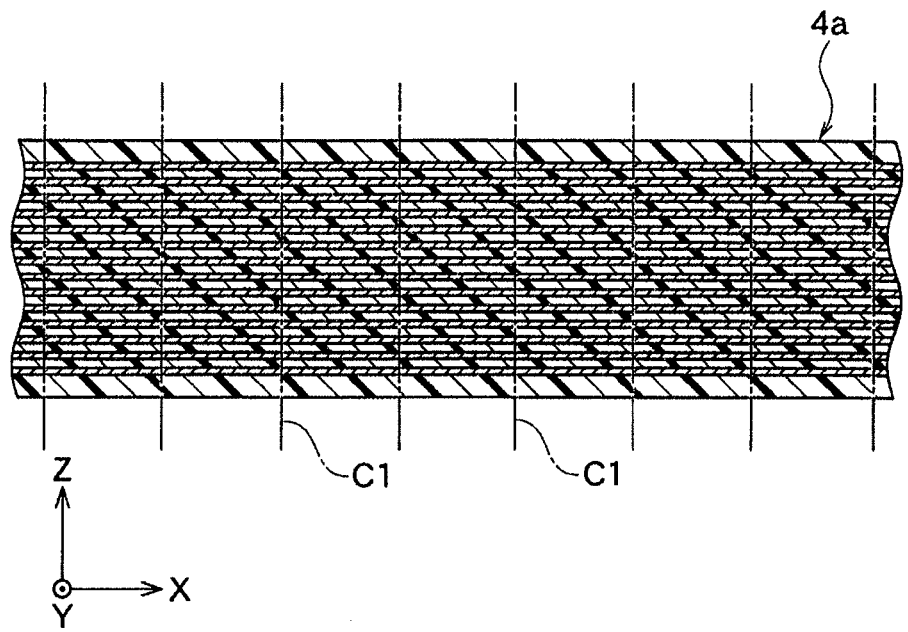
FIG. 6A is a schematic cross-sectional view of the laminate after lamination of the green sheet illustrated in FIG. 4 parallel to the X-Z-axis plane.
Figure 6B:
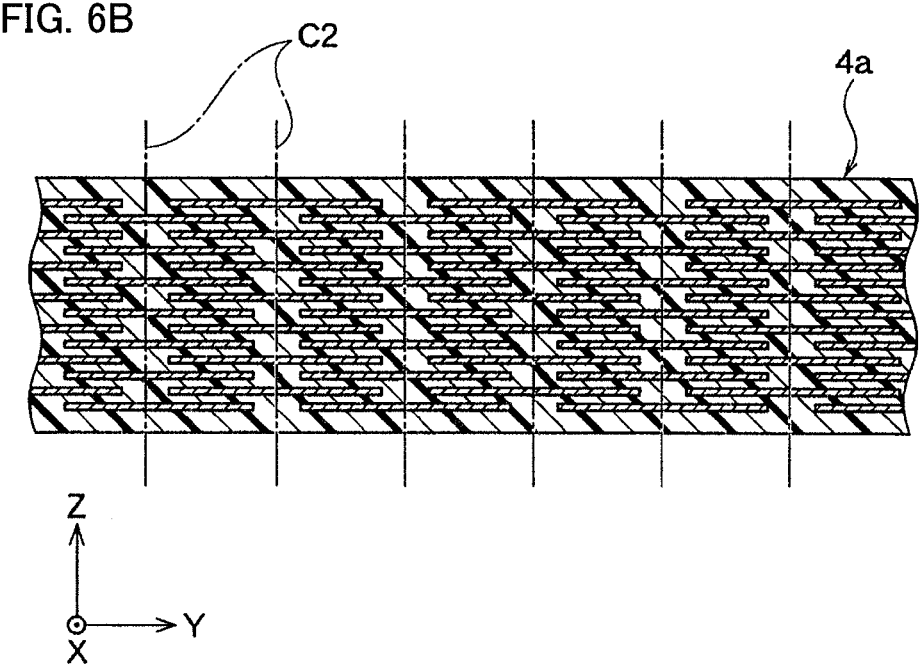
FIG. 6B is a schematic cross-sectional view of the laminate after the lamination of the green sheet illustrated in FIG. 4 parallel to the Y-Z-axis plane.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a temperature retention time: 8 hours, and an atmosphere: in the air.

The condition for calcination was set so as to have a rate of temperature rise: 800° C./hour, a retention temperature: from 1000° C. to 1200° C., a temperature retention time: 0.1 hour, and a cooling speed: 800° C./hour. Incidentally, the atmosphere gas was a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

Next, a corner R was formed at the corner portion of the element body 3 thus obtained by a barrel, and the end surface in the X-axis direction of the element body 3 was mirror-polished by lapping.

Next, a paste for insulating layer was prepared by kneading a predetermined amount of a predetermined glass powder, a binder containing ethyl cellulose as the main component, terpineol of the dispersion medium, and acetone by a mixer such that the insulating layer 16 had the volume ratio of glass and the average weight ratio of Si in the glass presented in Table 1.

The chip obtained by coating the paste for insulating layer on the entire surface of the end surface in the X-axis direction of the element body 3 through dipping and drying the paste was subjected to the binder removal treatment and baking using a belt conveyor furnace to form the insulating layer 16 on the element body 3, thereby obtaining the ceramic sintered body 4. The conditions for drying of the paste for insulating layer, binder removal treatment, and baking were as follows.

Drying
Temperature: 180° C.
Binder removal treatment
Rate of temperature rise: 1000° C./hour
Retention temperature: 500° C.
Temperature retention time: 0.25 hour
Atmosphere: in the air
Baking
Rate of temperature rise: 700° C./hour
Retention temperature: from 700° C. to 1000° C.
Temperature retention time: 0.5 hour
Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 μm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted metal paste.

The metal paste thus obtained was coated through dipping on the entire surface in the Y-axis direction of the ceramic sintered body 4, the end portion in the Y-axis direction of the end surface in the X-axis direction, and the end portion in the Y-axis direction of the end surface in the Z-axis direction. The spreading width in the Y-axis direction at the end surface in the X-axis direction and the end surface in the Z-axis direction was from 100 μm to 200 μm.

The ceramic sintered body 4 on which the metal paste was coated was baked for 60 minutes at 650° C. in a $N_2$ atmosphere to form a metal paste-baked film.

Next, the ceramic sintered body 4 on which the metal paste-baked film was formed was subjected to Ni plating in a Ni plating solution for an immersion time of 120 minutes at an immersion temperature of 50° C. and then Sn plating in a Sn plating solution for an immersion time of 80 minutes at an immersion temperature of 25° C., thereby obtaining a multilayer ceramic capacitor 2 on which the external electrodes 6 and 8 were formed.

The number of the inner dielectric layer 10 in the capacitor sample 2 (multilayer ceramic capacitor 2) manufactured as described above was 200 layers, the thickness of the inner dielectric layer 10 was 0.8 μm, the thickness of the internal electrode layer 12 was about 0.6 μm, and Wgap was from 1 to 30 μm. The size of the capacitor sample 2 was that the width in the X-axis direction was 0.32 mm, the length in the Y-axis direction was 0.60 mm, and the height in the Z-axis direction was 0.32 mm.

The capacitor sample 2 and the like thus obtained were measured or evaluated by the following methods.

<Confirmation of Diffusing Layer>

The resin embedding was conducted so that the capacitor sample 2 stood facing down the end surface in the Z-axis direction, and the other end surface was polished along the Z-axis direction of the capacitor sample 2, thereby obtaining a polished cross section having the length of the Z-axis direction of the element body 3 of ½H0. Next, this polished cross section was subjected to ion milling to remove the undercut caused by polishing. A cross section for observation was obtained in this manner. A flake sample was fabricated from an arbitrary part of the bonding portion of the insulating layer 16 with the external electrodes 6 and 8 on the cross section thus obtained by FIB, and the presence or absence of the diffusing layer 18 was confirmed by STEM-EDS. The results are presented in Table 1 and Table 2.

In addition, the length J of the bonding portion 18 of the insulating layer 16 with the external electrodes 6 and 8 on the end surface in the X-axis direction of the element body 3 was measured. The results are presented in Table 1 and Table 2.

<Peeling Off of External Electrode after Plating Treatment>

The presence or absence of peeling off of the external electrodes 6 and 8 on the insulating layer 16 after the plating treatment was visually confirmed for each of 100 capacitor samples. The results are presented in Table 1 and Table 2.

<Stop Deflection Test>

Figure 8:
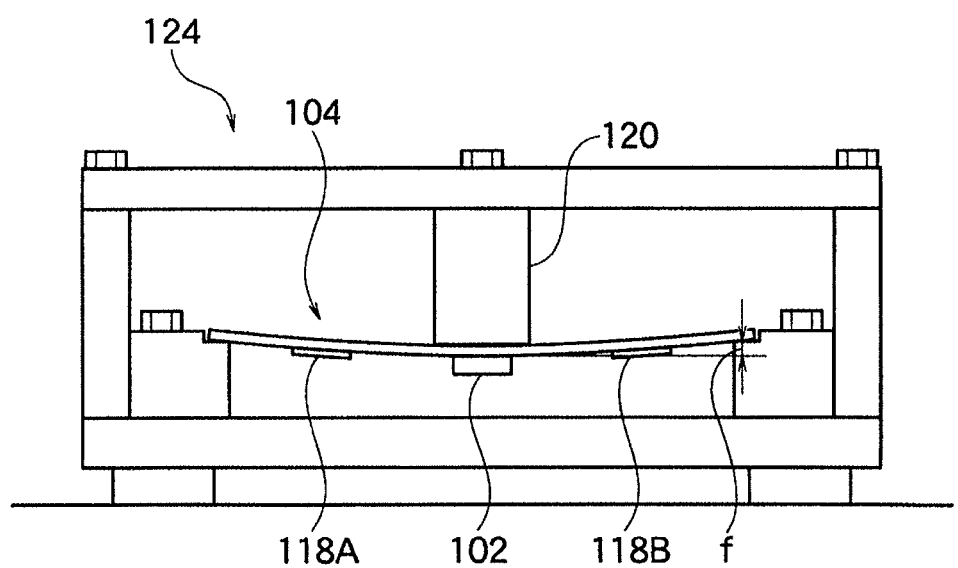
FIG. 8 is a schematic view for explaining a method for the stopping deflection test and limit deflection test of the present Example.
Figure 8:
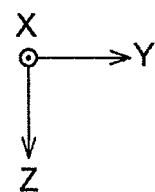

As illustrated in FIG. 8, the external electrode of the capacitor sample 102 was mounted on the pad portion of a test substrate 104 by soldering. The material for the test substrate 104 was made of a glass-cloth epoxy resin. The size of the test substrate 104 was that the wide in the X-axis direction was 40 mm, the length in the Y-axis direction was 100 mm, and the thickness was 0.8 mm.

An LCR meter was connected to test terminals 118A and 118B (respectively connected to the external electrode of the capacitor sample 102 through a wire) which were illustrated in FIG. 8 and prepared by disposing the above test substrate 104 in an apparatus 124 illustrated in FIG. 8, pressurizing it at a pressurizing portion 120 so that the amount of deflection of the test substrate 104 was 1 mm, and holding the state for 5 seconds, and the electrostatic capacity was measured. The electrostatic capacity was measured at a frequency of 1 kHz and 0.5 Vrm. It was judged to be acceptable when ΔC/C was ±10% or less where C denoted the electrostatic capacity before the pressurization and ΔC denoted the difference in electrostatic capacity before and after the pressurization. The operation described above was conducted for 20 capacitor samples, and it was judged to be favorable in a case in which the number of the unacceptable was 0. The results are presented in Table 1 and Table 2. In Table 1 and able 2, ○ was granted in a case in which the number of the unacceptable was 0 in the stop deflection test. Incidentally, the internal structure of the capacitor sample 102 according to the present Example is the same as that of the multilayer ceramic capacitor 2 illustrated in FIG. 1A.

TABLE 1

| | Insulating layer | | | | External electrode | | | | | | |
|---|---|---|---|---|---|---|---|---|---|---|---|
| | Glass | | | | | Glass | | Bonding portion of | | Peeling | |
| | | Average | | | | | Average | Amount of | | | off | |
| Sample number | Volume ratio of glass (vol %) | weight ratio of Si in glass (wt %) | Other components in glass | Other components ※1 | Conductive material | weight ratio of Si in glass | glass added (wt %)※2 | Length J (μm) | Diffusing layer | defect of external electrode | Stop deflection test |
| 1 | 100 | 50 | Ca, Sr, Ba, Zn, Zr, Al, B | | Cu | 20 | 10 | 130 | Present | 0/100 | ○ |
| 2 | 100 | 25 | Ca, Sr, Ba, Zn, Al, B, K | | Cu | 20 | 10 | 140 | Present | 0/100 | ○ |
| 3 | 100 | 20 | Ca, Sr, Ba, Zn, Zr, Al, B | | Cu | 20 | 10 | 150 | Present | 81/100 | x |
| 4 | 100 | 50 | Ca, Sr, Ba, Zn, Zr, Al, B | | Cu | 2 | 10 | 160 | Present | 0/100 | ○ |
| 5 | 100 | 50 | Ca, Sr, Ba, Zn, Zr, Al, B | | Cu | 0 | 10 | 200 | Absent | 34/100 | x |
| 6 | 20 | 50 | Ca, Sr, Ba, Zn, Zr, Al, B | BaTiO₃ (75) CaZrO₃ (5) | Cu | 20 | 10 | 115 | Absent | 50/100 | x |

※1: Value in parentheses represents volume ratio of other components (vol %)
※2: Weight ratio of electrode film of external electrode (wt %)

TABLE 2

| | Insulating layer | | | | External electrode | | | | | | |
|---|---|---|---|---|---|---|---|---|---|---|---|
| | Glass | | | | | Glass | | | | | |
| Sample number | Volume ratio of glass in insulating layer (vol %) | Average weight ratio of Si in glass (wt %) | Other components in glass | Other components ※1 | Conductive material | Average weight ratio of Si in glass (wt %) | Amount of glass added (wt %)※2 | Bonding portion of insulating layer with external electrode | | Peeling off defect of external electrode | Stop deflection test |
| | | | | | | | | Length (μm) | Diffusing layer | | |
| 7 | 40 | 50 | Ca, Sr, Ba, Zn, Zr, Al, B | BaTiO₃ (30) CaTiO₃ (30) | Cu | 20 | 10 | 155 | Present | 0/100 | ○ |
| 8 | 80 | 50 | Ca, Sr, Ba, Zn, Zr, Na | Al₂O₃ (20) | Cu | 20 | 10 | 150 | Present | 0/100 | ○ |
| 9 | 80 | 50 | Sr, Ba, Zn, Ti, Al, B | CaZrO₃ (20) | Cu | 20 | 10 | 152 | Present | 0/100 | ○ |
| 10 | 100 | 50 | Ca, Sr, Ba, Zn, Zr, Al, B | | Cu | 20 | 10 | 0 | Absent | 0/100 | x Defective mounting |
| 11 | 100 | 50 | Ca, Sr, Ba, Zn, Zr, Al, B | | Ag | 10 | 10 | 160 | Present | 0/100 | ○ |
| 12 | 100 | 50 | Ca, Sr, Ba, Zn, Zr, Al, B | | Ni | 10 | 10 | 150 | Present | 0/100 | ○ |

※1: Value in parentheses represents volume ratio of other components (vol %)
※2: Weight ratio of electrode film of external electrode (wt %)

From Table 1 and Table 2, it has been confirmed that it withstands the stop deflection test in a case in which the glass is contained in the insulating layer at more than 20 vol %, the Si content in the glass of the insulating layer is more than 20 wt %, Si is contained in the glass contained in the external electrode, and it has a diffusing layer (sample No. 1, 2, 4, 7 to 9, 11, and 12).

Incidentally, it has been confirmed that the sample No. 10 which has the length J of 0 μm and does not have a bonding portion of the insulating layer with the external electrode on the end surface in the X-axis direction of the element body is not able to take a sufficient solder bonding area at the time of the stop deflection test, and thus the capacitor sample cannot be fixed to the substrate so that defective mounting is caused.

From Table 1 and Table 2, it has been confirmed that the results for the peeling off defect of the external electrode is favorable in a case in which the glass is contained in the insulating layer at more than 20 vol %, the Si content in the glass of the insulating layer is more than 20 wt %, Si is contained in the glass contained in the external electrode, and it has a diffusing layer (sample No. 1, 2, 4, 7 to 9, 11, and 12) as compared to a case in which the glass is contained in the insulating layer at 20 vol % (sample No. 6), a case in which the Si content in the glass of the insulating layer is 20 wt % (sample No. 3), or a case in which Si is not contained in the glass contained in the external electrode (sample No. 5).

Example 2

The sample No. 1 and the sample No. 13 to the sample No. 17 were fabricated in the same manner as in Example 1 except that the treatment conditions before the external electrodes 6 and 8 were formed were those presented in Table 3 and the baking conditions of the electrode films 6a and 8b of the external electrodes 6 and 8 were changed to those presented in Table 3, the confirmation of the diffusing layer, the confirmation of peeling off of the external electrode after the plating treatment, and the stop deflection test were conducted, and the measurement of dD/dGD and the limit deflection test were conducted by the methods described below. The results are presented in Table 3. Incidentally, the sample No. 1 is the same sample as the sample No. 1 in Table 1 of Example 1.

The "ion milling after insulating layer formation" of the treatment conditions before the external electrode formation of the sample No. 14 to the sample No. 16 means that the surface of the insulating layer 16 is subjected to ion milling after the insulating layer 16 is formed. The surface can be in a state in which the diffusion phenomenon at the bonding portion with the external electrode is more easily advanced by subjecting the surface of the insulating layer 16 to ion milling.

In addition, the "lapping+ion milling after insulating layer formation" of the treatment conditions before the external electrode formation of the sample No. 17 means that the surface of the insulating layer 16 is subjected to lapping using diamond abrasive grains of ¹/₁₀ μm and further ion milling. The surface shape of the insulating layer becomes flatter, and it is possible to more easily advance the diffusion.

<dD/dGD> dGD and dD in the cross section obtained at the time of confirmation of the diffusing layer and flake sample were measured by FE-SEM and STEM-EDS. The results are presented in Table 3.

<Limit Deflection Test>

With regard to the limit deflection test, an LCR meter was connected to the test terminals 118A and 118B (respectively connected to the external electrode of the capacitor sample 102 through a wire) illustrated in FIG. 8 while disposing the above test substrate 104 in an apparatus 124 illustrated in FIG. 8 and pressurizing it at a pressurizing portion 120, and the electrostatic capacity was measured. The electrostatic capacity was measured at a frequency of 1 kHz and 0.5 Vrm. The amount f of deflection of the substrate when ΔC/C was ±10% or less where C denoted the electrostatic capacity before the pressurization and ΔC denoted the difference in electrostatic capacity before and after the pressurization was measured. The operation described above was conducted for 20 capacitor samples, and the results for the average of the amounts f of deflection are presented in Table 3 and Table 5. Incidentally, the internal structure of the capacitor sample 102 according to the present Example is the same as that of the multilayer ceramic capacitor 2 illustrated in FIG. 1A.

described below, and the number of strength defect of the external electrode was examined. The results are presented in Table 4 and Table 5.

GSi/TSi was calculated based on the Si content in the glass to be added to the paste for insulating layer 16 and the Si content in the glass to be added to the metal paste to be the electrode films 6a and 8a of the external electrodes 6 and 8.

<nA1>

It was counted on the cross section obtained at the time of confirmation of the diffusing layer by FE-SEM. Specifically, the number of interface aggregation 19a that was present in the region from the end to 100 μm in the Y-axis direction of the external electrodes 6 and 8 on the end surface in the X-axis direction of the capacitor sample 2 and satisfied 0.2<dT1/dGT1 was counted. The results are presented in Table 4.

TABLE 3

| Sample number | Treatment conditions before external electrode formation | Baking conditions of external electrode | | Bonding portion of insulating layer with external electrode | | Peeling off defect of external electrode | Stop deflection test | Limit deflection test | |
|---|---|---|---|---|---|---|---|---|---|
| | | Baking retention time ※3 | Baking retention temperature | Diffusing layer | dD/dGD | | | Amount of deflection (mm) | Rupture position |
| 1 | Without treatment | 100% | 650° C. | Present | 0.001 | 0/100 | ○ | 5.4 | Bonding portion of insulating layer with external electrode |
| 13 | Without treatment | 500% | 650° C. | Present | 0.003 | 0/100 | ○ | 10.1 | Ceramic sintered body |
| 14 | Ion milling after insulating layer formation | 1000% | 650° C. | Present | 0.01 | 0/100 | ○ | 12.6 | Ceramic sintered body |
| 15 | Ion milling after insulating layer formation | 100% | 700° C. | Present | 0.15 | 0/100 | ○ | 15.5 | Ceramic sintered body |
| 16 | Ion milling after insulating layer formation | 100% | 750° C. | Present | 0.3 | 0/100 | ○ | 11.0 | Ceramic sintered body |
| 17 | Lapping + ion milling after insulating layer formation | 500% | 750° C. | Present | 0.5 | 0/100 | ○ | 7.0 | Insulating layer |

※3: Baking retention time when baking retention time of Sample No. 1 is regarded as 100%

From Table 3, it has been confirmed that the results for the limit deflection test are favorable in a case in which dD/dGD is more than 0.001 and less than 0.5 (sample No. 13 to Sample No. 16) as compared to a case in which dD/dGD is 0.001 (sample No. 1) or a case in which dD/dGD is 0.5 (sample No. 17).

Example 3

The sample No. 18 to the sample No. 26 were fabricated in the same manner as in Example 2 except that GSi/TSi is set to those presented in Table 4, the confirmation of the diffusing layer, the measurement of dD/dGD, the confirmation of peeling off of the external electrode after the plating treatment, the stop deflection test, and the limit deflection test were conducted, the measurement of nA1 and the electrostatic capacity was conducted by the methods <Electrostatic Capacity>

The electrostatic capacity of the capacitor sample 2 was measured at a frequency of 1 kHz and 1.0 Vrm by a LCT meter at the time point at which 24 hours±1 hour elapsed after the capacitor sample 2 was subjected to the heat treatment for 1 hour at a temperature of 150° C. This operation was conducted for 20 capacitor samples, and the average thereof was determined. The results are presented in Table 5. It was judged to be favorable in a case in which the electrostatic capacity was 1.5 μF or more and it was judged to be more favorable in a case in which it was 1.9 μF or more.

<Number of Strength Defect of the External Electrode>

Figure 7:
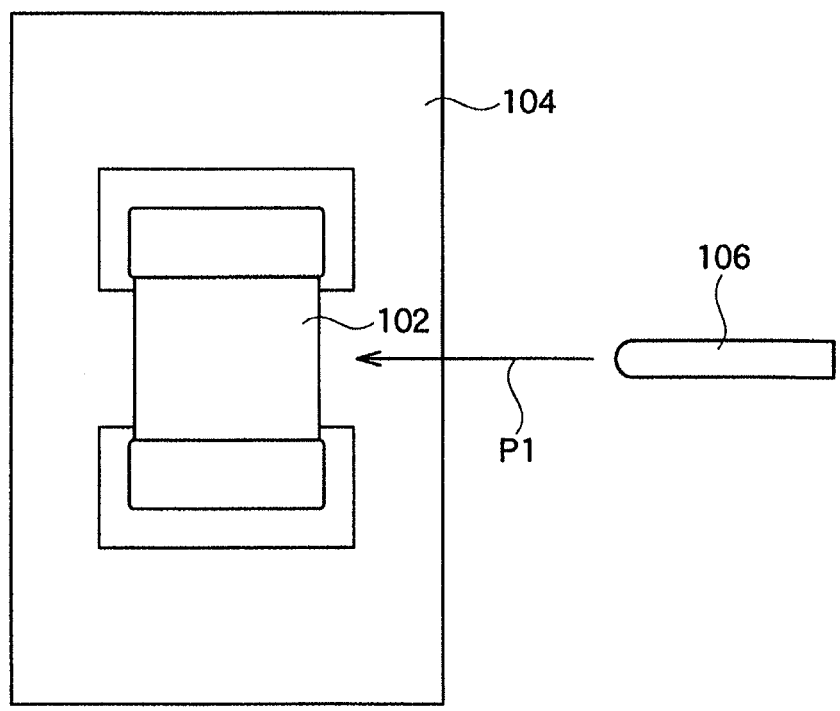
FIG. 7 is a schematic view for explaining a method for measuring the number of defective external electrodes of the present Example.

With regard to the number of strength defect of the external electrode, as illustrated in FIG. 7, a cemented carbide pressurizing jig 106 was directed toward the end surface in the X-axis direction of the capacitor sample in a state in which the capacitor sample 102 was mounted on the circuit board 104, and the capacitor sample was pressurized by 4 N from the direction of an arrow P1 and held for 10 seconds. Thereafter, the external electrodes 6 and 8, the insulating layer 16, and the appearance of the element body 16 were examined. This operation was conducted for 20 capacitor samples, and the number of capacitor samples which had an abnormality was adopted as the number of strength defect of the external electrode. The results are presented in Table 5.

TABLE 4

| Sample number | Insulating layer Average weight ratio of Si in glass (wt %) | External electrode Average weight ratio of Si in glass (wt %) | Amount of glass added (wt %)※2 | GSi/TSi | Treatment conditions before external electrode formation | Baking conditions of external electrode Baking retention time ※4 | Baking retention temperature | Bonding portion of insulating layer with external electrode Diffusing layer | dD/dGD | nA1 |
|---|---|---|---|---|---|---|---|---|---|---|
| 18 | 50 | 70 | 10 | 0.7 | Ion milling after insulating layer formation | 1000% | 650° C. | Present | 0.27 | 0 |
| 19 | 50 | 50 | 10 | 1.0 | Ion milling after insulating layer formation | 1000% | 650° C. | Absent | Absent | |
| 20 | 50 | 20 | 10 | 2.5 | Ion milling after insulating layer formation | 1000% | 650° C. | Present | 0.01 | 1 |
| 21 | 50 | 10 | 10 | 5.0 | Ion milling after insulating layer formation | 1000% | 650° C. | Present | 0.01 | 4 |
| 22 | 75 | 10 | 10 | 7.5 | Ion milling after insulating layer formation | 1000% | 650° C. | Present | 0.008 | 3 |
| 23 | 76 | 5 | 10 | 15.0 | Ion milling after insulating layer formation | 1000% | 750° C. | Present | 0.006 | 1 |
| 24 | 75 | 3 | 10 | 25.0 | Ion milling after insulating layer formation | 1000% | 850° C. | Present | 0.005 | 0 |
| 25 | 50 | 20 | 10 | 2.5 | Ion milling after insulating layer formation | 1000% | 670° C. | Present | 0.06 | 4 |
| 26 | 50 | 20 | 15 | 2.5 | Ion milling after insulating layer formation | 1000% | 670° C. | Present | 0.12 | 5 |

※2: Weight ratio of electrode film of external electrode (wt %)
※4: Baking retention time when baking retention time of Sample No. 1 is regarded as 100%

TABLE 5

| Sample number | Peeling off defect of external electrode | Stop deflection test | Limit deflection test Amount of deflection (mm) | Rupture position | Electrostatic capacity | Number of strength defect of external electrode |
|---|---|---|---|---|---|---|
| 18 | 0/100 | ○ | 13.3 | Ceramic sintered body | 1.49 μF | 2/20 |
| 19 | 15/100 | x | | | | |
| 20 | 0/100 | ○ | 12.6 | Ceramic sintered body | 2.01 μF | 2/20 |
| 21 | 0/100 | ○ | 13.6 | Ceramic sintered body | 2.04 μF | 0/20 |
| 22 | 0/100 | ○ | 12 | Ceramic sintered body | 1.95 μF | 1/20 |
| 23 | 0/100 | ○ | 10.5 | Ceramic sintered body | 1.82 μF | 2/20 |
| 24 | 0/100 | ○ | 10.1 | Ceramic sintered body | 1.56 μF | 1/20 |
| 25 | 0/100 | ○ | 13.8 | Ceramic sintered body | 2.01 μF | 0/20 |
| 26 | 0/100 | ○ | 15.5 | Ceramic sintered body | 2.01 μF | 0/20 |

From Table 4 and Table 5, it has been confirmed that the electrostatic capacity is favorable in a case in which GSi/TSi is greater than 1.0 and smaller than 25.0 (sample No. 20 to 23, 25, and 26) as compared to a case in which GSi/TSi is 0.7 (sample No. 18) or a case in which GSi/TSi is 25.0 (sample No. 24).

In addition, from Table 4 and Table 5, it has been confirmed that the peeling off defect of the external electrode and the results for the stop deflection test are favorable in a case in which GSi/TSi is greater than 1.0 and smaller than 25.0 (sample No. 20 to 23, 25, and 26) as compared to a case in which GSi/TSi is 1.0 (sample No. 19).

From Table 4 and Table 5, it has been confirmed that the number of strength defect of the external electrode is small in a case in which GSi/TSi is greater than 1.0 and smaller than 25.0 and nA1 is 2 or more (sample Nos. 21, 22, 25, and 26) as compared to a case in which GSi/TSi is greater than 1.0 and smaller than 25.0 and nA1 is less than 2 (sample No. 20 and sample No. 23).

INDUSTRIAL APPLICABILITY

As described above, the multilayer electronic component according to the present invention is useful as an electronic part to be used in laptop computers or smart phones which are often used to have a great capacity while being compact.

EXPLANATIONS OF LETTERS OR NUMERALS 2, 102 . . . multilayer ceramic capacitor
3 . . . element body
4 . . . ceramic sintered body
6 . . . first external electrode
6a . . . electrode film
6b . . . covering layer
8 . . . second external electrode
8a . . . electrode film
8b . . . covering film
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
18 . . . bonding portion
18a . . . diffusing layer
19 . . . aggregated portion
19a . . . interface aggregation
20 . . . step absorbing layer
32 . . . gap between internal electrode pattern layers
104 . . . substrate
106 . . . pressurizing jig
114 . . . pad portion
118A, 118B . . . test terminal and
120 . . . pressurizing portion

The invention claimed is:

1. A multilayer electronic component comprising an element body having an internal electrode layer and a dielectric layer, both of which are substantially parallel to a plane including a first axis and a second axis and are alternately laminated along a third axis direction, wherein a pair of side surfaces facing each other in the first axis direction of the element body is respectively equipped with an insulating layer, a pair of end surfaces facing each other in the second axis direction of the element body is respectively equipped with an external electrode electrically connected to the internal electrode layer, a main component of the insulating layer is constituted by glass containing Si at 25 wt % or more, the external electrode includes glass containing at least Si, the external electrode covers an end portion in the second axial direction of the insulating layer in the side surface, a diffusing layer is present at least at a bonding portion of the insulating layer with the external electrode in the side surface, and a gradient of a concentration of Si is present in the diffusing layer along a direction perpendicular to the bonding portion.

2. The multilayer electronic component according to claim 1, wherein a pair of main surfaces facing each other in the third axis direction of the element body is respectively equipped with the insulating layer, the external electrode covers an end portion in the second axial direction of the insulating layer in the main surface, and the diffusing layer is present at least at a bonding portion of the insulating layer with the external electrode in the main surface.

3. The multilayer electronic component according to claim 1, wherein dD/dGD is 0.003 to 0.3, where dD denotes a thickness of the diffusing layer along a direction perpendicular to the bonding portion and dGD denotes a thickness of the insulating layer present on an inner side in a direction perpendicular to the bonding portion of a site corresponding to the thickness dD.

4. The multilayer electronic component according to claim 2, wherein dD/dGD is 0.003 to 0.3, where dD denotes a thickness of the diffusing layer along a direction perpendicular to the bonding portion and dGD denotes a thickness of the insulating layer present on an inner side in a direction perpendicular to the bonding portion of a site corresponding to the thickness dD.

5. The multilayer electronic component according to claim 1, wherein

GSi/TSi satisfies 1.0<GSi/TSi≤15.0, where

GSi denotes an average weight ratio of Si contained in the glass of the insulating layer and TSi denotes an average weight ratio of Si contained in the glass of the external electrode.

6. The multilayer electronic component according to claim 2, wherein

GSi/TSi satisfies 1.0<GSi/TSi≤15.0, where

GSi denotes an average weight ratio of Si contained in the glass of the insulating layer and TSi denotes an average weight ratio of Si contained in the glass of the external electrode.

7. The multilayer electronic component according to claim 3, wherein

GSi/TSi satisfies 1.0<GSi/TSi≤15.0, where

GSi denotes an average weight ratio of Si contained in the glass of the insulating layer and TSi denotes an average weight ratio of Si contained in the glass of the external electrode.

8. The multilayer electronic component according to claim 4, wherein

GSi/TSi satisfies 1.0<GSi/TSi≤15.0, where

GSi denotes an average weight ratio of Si contained in the glass of the insulating layer and TSi denotes an average weight ratio of Si contained in the glass of the external electrode.

9. The multilayer electronic component according to claim 5, wherein
an aggregated portion having glass aggregated is present on the external electrode side of the bonding portion,
$0.2 < dT1/dGT1$ is satisfied in any cutting plane parallel to the first axis and the second axis, where
dT1 denotes a maximum thickness of the aggregated portion along a direction perpendicular to the bonding portion and
dGT1 denotes a thickness of the insulating layer present on an inner side in a direction perpendicular to the bonding portion of a site corresponding to the thickness dT1, and
$2 \leq nA1$ is satisfied, where
nA1 denotes the number of interface aggregation present in a region from an end to 100 μm in the second axis direction of the external electrode of the side surface, wherein
the interface aggregation denotes the aggregated portion in contact with the insulating layer.

10. The multilayer electronic component according to claim 6, wherein
an aggregated portion having glass aggregated is present on the external electrode side of the bonding portion,
$0.2 < dT1/dGT1$ is satisfied in any cutting plane parallel to the first axis and the second axis, where
dT1 denotes a maximum thickness of the aggregated portion along a direction perpendicular to the bonding portion and
dGT1 denotes a thickness of the insulating layer present on an inner side in a direction perpendicular to the bonding portion of a site corresponding to the thickness dT1, and
$2 \leq nA1$ is satisfied, where
nA1 denotes the number of interface aggregation present in a region from an end to 100 μm in the second axis direction of the external electrode of the side surface, wherein
the interface aggregation denotes the aggregated portion in contact with the insulating layer.

11. The multilayer electronic component according to claim 7, wherein
an aggregated portion having glass aggregated is present on the external electrode side of the bonding portion,
$0.2 < dT1/dGT1$ is satisfied in any cutting plane parallel to the first axis and the second axis, where
dT1 denotes a maximum thickness of the aggregated portion along a direction perpendicular to the bonding portion and
dGT1 denotes a thickness of the insulating layer present on an inner side in a direction perpendicular to the bonding portion of a site corresponding to the thickness dT1, and
$2 \leq nA1$ is satisfied, where
nA1 denotes the number of interface aggregation present in a region from an end to 100 μm in the second axis direction of the external electrode of the side surface, wherein
the interface aggregation denotes the aggregated portion in contact with the insulating layer.

12. The multilayer electronic component according to claim 8, wherein
an aggregated portion having glass aggregated is present on the external electrode side of the bonding portion,
$0.2 < dT1/dGT1$ is satisfied in any cutting plane parallel to the first axis and the second axis, where
dT1 denotes a maximum thickness of the aggregated portion along a direction perpendicular to the bonding portion and
dGT1 denotes a thickness of the insulating layer present on an inner side in a direction perpendicular to the bonding portion of a site corresponding to the thickness dT1, and
$2 \leq nA1$ is satisfied, where
nA1 denotes the number of interface aggregation present in a region from an end to 100 μm in the second axis direction of the external electrode of the side surface, wherein
the interface aggregation denotes the aggregated portion in contact with the insulating layer.

13. The multilayer electronic component according to claim 9, wherein
$0.2 < dT3/dGT3$ is satisfied in any cutting plane parallel to the second axis and the third axis, where
dT3 denotes a maximum thickness of the aggregated portion along a direction perpendicular to the bonding portion and
dGT3 denotes a thickness of the insulating layer present on an inner side in a direction perpendicular to the bonding portion of a site corresponding to the thickness dT3, and
$2 \leq nA3$ is satisfied, where
nA3 denotes the number of interface aggregation present in a region from an end to 100 μm in the second axis direction of the external electrode of the main surface, wherein
the interface aggregation denotes the aggregated portion in contact with the insulating layer.

14. The multilayer electronic component according to claim 10, wherein
$0.2 < dT3/dGT3$ is satisfied in any cutting plane parallel to the second axis and the third axis, where
dT3 denotes a maximum thickness of the aggregated portion along a direction perpendicular to the bonding portion and
dGT3 denotes a thickness of the insulating layer present on an inner side in a direction perpendicular to the bonding portion of a site corresponding to the thickness dT3, and
$2 \leq nA3$ is satisfied, where
nA3 denotes the number of interface aggregation present in a region from an end to 100 μm in the second axis direction of the external electrode of the main surface, wherein
the interface aggregation denotes the aggregated portion in contact with the insulating layer.

15. The multilayer electronic component according to claim 11, wherein
$0.2 < dT3/dGT3$ is satisfied in any cutting plane parallel to the second axis and the third axis, where
dT3 denotes a maximum thickness of the aggregated portion along a direction perpendicular to the bonding portion and
dGT3 denotes a thickness of the insulating layer present on an inner side in a direction perpendicular to the bonding portion of a site corresponding to the thickness dT3, and
$2 \leq nA3$ is satisfied, where nA3 denotes the number of interface aggregation present in a region from an end to 100 μm in the second axis direction of the external electrode of the main surface, wherein the interface aggregation denotes the aggregated portion in contact with the insulating layer.

16. The multilayer electronic component according to claim 12, wherein $0.2 < dT3/dGT3$ is satisfied in any cutting plane parallel to the second axis and the third axis, where dT3 denotes a maximum thickness of the aggregated portion along a direction perpendicular to the bonding portion and dGT3 denotes a thickness of the insulating layer present on an inner side in a direction perpendicular to the bonding portion of a site corresponding to the thickness dT3, and $2 \leq nA3$ is satisfied, where nA3 denotes the number of interface aggregation present in a region from an end to 100 μm in the second axis direction of the external electrode of the main surface, wherein the interface aggregation denotes the aggregated portion in contact with the insulating layer.

* * * * *